US008064297B2

(12) United States Patent
Sato et al.

(10) Patent No.: US 8,064,297 B2
(45) Date of Patent: Nov. 22, 2011

(54) ELECTROMAGNETIC FIELD GENERATING ELEMENT, INFORMATION RECORDING AND REPRODUCTION HEAD, AND INFORMATION RECORDING AND REPRODUCTION DEVICE

(75) Inventors: Junichi Sato, Nara (JP); Yoshiteru Murakami, Nishinomiya (JP); Hideki Eto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 406 days.

(21) Appl. No.: 12/322,112

(22) Filed: Jan. 29, 2009

(65) Prior Publication Data

US 2009/0207702 A1    Aug. 20, 2009

(30) Foreign Application Priority Data

Jan. 30, 2008    (JP) ................................ 2008-019741
Sep. 22, 2008    (JP) ................................ 2008-242582

(51) Int. Cl.
*G11B 11/00*    (2006.01)
(52) U.S. Cl. .................. 369/13.33; 369/13.14
(58) Field of Classification Search ............... 369/13.23, 369/13.22, 13.33, 13.14; 720/658
See application file for complete search history.

(56) References Cited

U.S. PATENT DOCUMENTS

| 5,656,385 | A | 8/1997 | Nakajima et al. |
| 6,143,436 | A | 11/2000 | Nakajima et al. |
| 7,489,597 | B2 * | 2/2009 | Miyanishi et al. ......... 369/13.33 |
| 7,690,009 | B2 * | 3/2010 | Miyanishi et al. ............ 720/658 |
| 2002/0167870 | A1 | 11/2002 | Akiyama et al. |
| 2004/0194119 | A1 | 9/2004 | Miyanishi et al. |
| 2005/0018547 | A1 | 1/2005 | Akiyama et al. |
| 2006/0075417 | A1 | 4/2006 | Miyanishi et al. |
| 2007/0096854 | A1 | 5/2007 | Matsumoto et al. |
| 2009/0106783 | A1 | 4/2009 | Miyanishi et al. |

FOREIGN PATENT DOCUMENTS

| JP | 02-210609 | 8/1990 |
| JP | 2001-291212 | 10/2001 |
| JP | 2006-114099 | 4/2006 |
| JP | 2007-305184 A | 11/2007 |

* cited by examiner

*Primary Examiner* — Ali Neyzari
(74) *Attorney, Agent, or Firm* — George W. Neuner; Edwards Wildman Palmer LLP

(57) ABSTRACT

An electromagnetic field generating element includes a conductor that generates near-field light when irradiated with light and generates a magnetic field when a current flows through the conductor. The electromagnetic field generating element further includes a soft magnetic body provided at a position along a dimension of the conductor, the dimension being perpendicular to (i) a direction in which the conductor faces a magnetic recording medium to which the near-field light and the magnetic field are applied and to (ii) a direction in which the current flows. The present invention thus allows for provision of an electromagnetic field generating element that allows for reduction in its power consumption in optically assisted magnetic read/write using near-field light.

14 Claims, 12 Drawing Sheets

(a) RELATIVE MAGNETIC PERMEABILITY μr=10

(b) RELATIVE MAGNETIC PERMEABILITY μr=1

ELECTROMAGNETIC FIELD GENERATING ELEMENT, INFORMATION RECORDING AND REPRODUCTION HEAD, AND INFORMATION RECORDING AND REPRODUCTION DEVICE

This Nonprovisional application claims priority under 35 U.S.C. §119(a) on Patent Application No. 2008-019741 filed in Japan on Jan. 30, 2008, and Patent Application No. 2008-242582 filed in Japan on Sep. 22, 2008, the entire contents of which are hereby incorporated by reference.

TECHNICAL FIELD

The present invention relates to an electromagnetic field generating element, an information recording and reproduction head, and an information recording and reproduction device, each of which generates a magnetic field (magnetization) and near-field light through a conductor and, in particular, to an electromagnetic field generating element, an information recording and reproduction head, and an information recording and reproduction device, each of which is suitably applicable in a magnetic recording apparatus that reads and writes data on a region of a magnetic layer, the region being heated by light (heat source), and each of which performs recording with use of light and magnetism.

BACKGROUND ART

In the field of magnetic memories represented by hard disk drives (HDDs), research has been actively conducted on a recording method involving the use of heating means using a light beam, for the purpose of achieving higher bit density.

For example, Patent Literature 1 (Japanese Patent Application Publication, Tokukaihei, No. 4-176034 A; Publication Date: Jun. 23, 1992) discloses, as a technology for high-density magnetic read/write, a magnetic recording medium including a recording layer made of an n-type ferrimagnetic material having a compensation temperature substantially equal to room temperature, and also discloses an optically assisted read/write system using a light beam and the above medium.

According to the above system, recording is performed by heating a local portion of the magnetic recording medium by light irradiation, i.e., by providing optical assistance. This reduces the coercive force of the local portion and thereby allows a magnetic head to perform recording. As described above, the optically assisted read/write system allows data to be recorded on a magnetic recording medium having a high coercive force as compared to the intensity of a magnetic field generated by a magnetic head. In the case of a magnetic recording medium having a high coercive force, the above arrangement further prevents the problem of heat fluctuation, thereby allowing ultrahigh-density magnetic recording. The "problem of heat fluctuation" herein refers to a problem of loss of data recorded on a magnetic recording medium, the loss being caused when heat energy of room temperature, for example, disturbs the magnetization direction of the magnetic recording medium.

Further, a method is proposed as an application of the above optically assisted read/write system. The method uses near-field light as a light beam for forming smaller magnetic bits so that recording is performed with higher density. This method allows an area of a magnetic recording medium, the area having a temperature elevated by optical assistance, i.e., a spot of illumination by the near-field light, to have a diameter of several tens of nm or less. This in turn allows for formation of a magnetic bit of several tens of nm or less in size. Consequently, this method enables ultrahigh-density recording.

One disclosed example of the above magnetic head is a magnetic head (information recording and reproduction head) including an electromagnetic field generating element that includes: a substrate serving as a slider; a semiconductor laser section disposed on the substrate and serving as a light source; and a conductor section disposed on the substrate and having a constricted portion. The electromagnetic field generating element, disclosed in Patent Literature 2 (Japanese Patent Application Publication, Tokukai, No. 2004-303299 A; Publication Date: Oct. 28, 2004), includes: a light source; a conductor having a constricted portion in which an electric current path is narrowed; and a substrate on which the conductor is disposed in the form of a layer. Irradiation of the constricted portion with light from the light source generates a near-field light in the constricted portion.

Patent Literature 3 (Japanese Patent Application Publication, Tokukai, No. 2002-298302 A; Publication Date: Oct. 11, 2002) discloses a magnetic head (optically assisted magnetic recording head) that includes a pair of structures (preferably, soft magnetic bodies) separated by a gap and that applies a near-field light and a magnetic field from the gap.

SUMMARY OF INVENTION

It is an object of the present invention to provide an electromagnetic field generating element, an information recording and reproduction head, and an information recording and reproduction device, each of which allows for reduction in its power consumption in optically assisted magnetic read/write using near-field light.

The inventors of the present invention diligently conducted examination to attain the above object and consequently arrived at the present invention by first finding that the following arrangement allows for reduction in the power consumption in optically assisted magnetic read/write using near-field light: an electromagnetic field generating element including: a conductor, the conductor generating near-field light when irradiated with light and generating a magnetic field by a current flowing through the conductor, wherein a soft magnetic body is provided at a position along a dimension of the conductor, the dimension being perpendicular to (i) a direction in which the conductor faces an object to which the near-field light and the magnetic field are applied and to (ii) a direction in which the current flows.

With reference to (a) and (b) of FIG. 7, the following description deals with another example of the art of a magnetic head including an electromagnetic field generating element that includes: a substrate; a semiconductor laser section disposed on the substrate and serving as a light source; and a conductor section disposed on the substrate and having a constricted portion.

(a) of FIG. 7 is an elevational view of an electromagnetic field generating element, which is a modification of the electromagnetic field generating element of Patent Literature 2. The elevational view illustrates a surface of the electromagnetic field generating element serving as the above modification, the surface facing a magnetic recording medium. (b) of FIG. 7 is a schematic cross-sectional view taken along line 1Z-1Z of (a) of FIG. 7.

The electromagnetic field generating element illustrated in (a) and (b) of FIG. 7, when performing recording, causes a semiconductor laser section 11 serving as a light source to irradiate a constricted portion 19 of a conductor 13 with light 12. (a) of FIG. 7 illustrates a gap 20 having a width W on the order of 200 nm. The light 12 has a wavelength having a width of 400 nm or more. Therefore, the width W is narrower than the width of the wavelength of the light 12. This prevents the light 12 from entering the gap 20. However, the light 12 is transmitted along a surface of the conductor 13 in the form of a surface plasmon 14. The surface plasmon 14, after being transmitted to an end of the constricted portion 19 of the conductor 13, causes light to be emitted as a near-field light 15. The electromagnetic field generating element applies an electric current 16 to the constricted portion 19 concurrently with the emission of the light 12. This causes a magnetic field 71 to be generated.

Through the above operation, the electromagnetic field generating element illustrated in (a) and (b) of FIG. 7 heats a portion of a magnetic recording medium with the near-field light 15 and applies the magnetic field 71 to the portion that has a reduced coercive force due to the heating. Thus, a magnetic head including the electromagnetic field generating element illustrated in (a) and (b) of FIG. 7 is capable of optically assisted magnetic recording.

(a) of FIG. 7 further illustrates a substrate 10.

The electromagnetic field generating element illustrated in (a) and (b) of FIG. 7 is required to sufficiently increase the intensity of irradiation light, i.e., the temperature of a recording area of the magnetic recording medium. This poses a problem of high power consumption.

The following description deals with this problem.

The electromagnetic field generating element illustrated in (a) and (b) of FIG. 7 generates a magnetic field having an intensity of, for example, 17.3 kA/m (equivalent to 0.0218 T). Performing recording on a magnetic recording medium having a high coercive force requires reducing the coercive force of a recording area of the magnetic recording medium to the vicinity of 17 kA/m by heating the recording area to a relatively high temperature. A magnetic head including the electromagnetic field generating element illustrated in (a) and (b) of FIG. 7 irradiates an area of the magnetic recording medium with near-field light, the area substantially coinciding with an area to which the electromagnetic field generating element applies a magnetic field.

However, the irradiation of a rapidly rotating magnetic recording medium with light by the magnetic head results in a slight positional difference between (i) an area of the magnetic recording medium, the area being irradiated with the light and (ii) an area of the magnetic recording medium, the area having a temperature that has been raised to the largest extent by the light irradiation.

With reference to (a) through (d) of FIG. 8, the following qualitatively describes the reason for the slight positional difference between (i) the area irradiated with the light and (ii) the area having a temperature that has been raised to the largest extent by the light irradiation. For convenience of explanation, (a) through (c) of FIG. 8 are used to describe the case of raising the temperature of a moving (rotating) magnetic recording medium discontinuously in order of time. (d) of FIG. 8 is used to describe the case of raising the temperature of a moving (rotating) magnetic recording medium continuously in order of time.

(a) of FIG. 8 illustrates: (i) an irradiation light 81*a* irradiating the magnetic recording medium; and (ii) an area (raised-temperature portion) 82*a* of the magnetic recording medium, the area having a temperature raised by the irradiation light 81*a*. (b) of FIG. 8 illustrates: (i) an irradiation light 81*b* irradiating the magnetic recording medium a certain period of time after the moment of (a) of FIG. 8; (ii) an area (raised-temperature portion) 82*b* of the magnetic recording medium, the area having a temperature raised by the irradiation light 81*b*; and (iii) the raised-temperature portion 82*a*. As is clear from (b) of FIG. 8, the magnetic recording medium has the raised-temperature portion 82*b* in addition to the raised-temperature portion 82*a* after being irradiated twice with the light the certain period of time apart. The magnetic recording medium thus has a raised-temperature area corresponding to the combination of the raised-temperature portions 82*a* and 82*b*. This results in a slight positional difference, with respect to the direction in which the magnetic recording medium moves, between (i) the center of the raised-temperature area and (ii) the center of the raised-temperature portion 82*b* and also between (i) a portion of the raised-temperature area, the portion having the largest temperature rise, and (ii) a portion of the raised-temperature portion 82*b*, the portion having the largest temperature rise. The magnetic recording medium, when irradiated with an irradiation light 81*c* a further period of time after the moment of (b) of FIG. 8, similarly has another raised-temperature portion 82*c* in addition to the raised-temperature portions 82*a* and 82*b* (see (c) of FIG. 8).

(d) of FIG. 8 illustrates how the temperature of the magnetic recording medium is raised when raised continuously. The magnetic recording medium has a raised-temperature portion 82 having a temperature raised by an irradiation light 81. The dashed line of (d) of FIG. 8 represents the position of a portion of the raised-temperature portion 82, the portion having a temperature that has been raised to the largest extent by the light irradiation. This position is different from the position of irradiation with the irradiation light 81 with respect to the direction in which the magnetic recording medium moves.

The amount of the above difference is presumably in a range of several tens to 200 nm when the magnetic recording medium has a linear velocity of 10 to 30 m/s. The difference increases in proportion to the rotation rate of the magnetic recording medium. Therefore, the difference presumably increases in proportion to increase in the linear velocity.

In accordance with the principle of the optically assisted magnetic recording, i.e., "recording is performed by raising the temperature of a local recording portion of a magnetic recording medium so that the coercive force of the portion is decreased", a magnetic field is desirably applied not to an area of the magnet recording medium, the area being irradiated with a near-field light, but to an area having a temperature that has been raised to the largest extent by the irradiation with the near-field light.

A soft magnetic body, when a magnetic field is applied thereto, generates a magnetic field having an extensive intensity in proportion to the following formula:

(intensity of a magnetic field applied)×(magnetic permeability μ of the soft magnetic body).

In view of this, the inventors of the present invention arrived at the idea of providing a soft magnetic body in an electromagnetic field generating element, in accordance with the linear velocity of an object in motion, in such a position that a high magnetic field is applied to a portion of the object, the portion having a temperature that has been raised to the largest extent by irradiation of near-field light, thereby arriving at the above arrangement. Specifically, the electromagnetic field generating element of the present invention includes the soft magnetic body provided at a position of the conductor along the dimension perpendicular to (i) the direction in which the conductor faces the object to which the near-field light and the magnetic field are applied and to (ii) the direction in which the current flows.

The phrase "the direction in which the conductor faces the object" used herein refers to the direction in which the linear distance between the object and the conductor is shortest. Further, the soft magnetic body used herein refers to a magnetic body having a coercive force that is low enough for its magnetization to be reversed by a magnetic field having the above intensity; for example, a magnetic body having a coercive force not more than 63.7 kA/m (equivalent to 0.08 T).

As such, the electromagnetic field generating element of the present invention is suitably used for optically assisted magnetic read/write involving use of near-field light. Specifically, the provision of the electromagnetic field generating element of the present invention in an information recording and reproduction head for performing optically assisted magnetic read/write allows a magnetic field to be easily applied, in accordance with the linear velocity of a magnetic recording medium on which magnetic recording is to be performed, to an area of the magnetic recording medium, the area having a temperature that has been raised to the largest extent by irradiation with the near-field light. Unlike in an information recording and reproduction head including a conventional electromagnetic field generating element, this eliminates the need to sufficiently increase the intensity of irradiation light, i.e., the temperature of a recording area of the magnetic recording medium in compensation for a low magnetic field and for a positional difference between an area having a raised temperature and an area to which a magnetic field is applied. This consequently allows for reduction in the power consumption.

An information recording and reproduction head of the present invention includes the above electromagnetic field generating element. Specifically, the information recording and reproduction head of the present invention includes the above electromagnetic field generating element, wherein an object to which the electromagnetic field generating element applies the near-field light and the magnetic field is a magnetic recording medium, and the information recording and reproduction head further includes a reproduction section for reproducing information which has been recorded on a target portion of the magnetic recording medium.

An information recording and reproduction device of the present invention includes the above information recording and reproduction head.

According to the above arrangement, the information recording and reproduction device is capable of applying a high magnetic field and also applying such a magnetic field to an area of an object, the area having a temperature that has been raised to the largest extent by light irradiation. This allows for achievement of an information recording and reproduction head and an information recording and reproduction device that perform optically assisted magnetic recording at high efficiency.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 illustrates an embodiment of the present invention, where (a) of FIG. 1 is an elevational view of an electromagnetic field generating element of the present invention and (b) of FIG. 1 is a cross-sectional view taken along line 1A-1A in (a) of FIG. 1.

Figure 2:
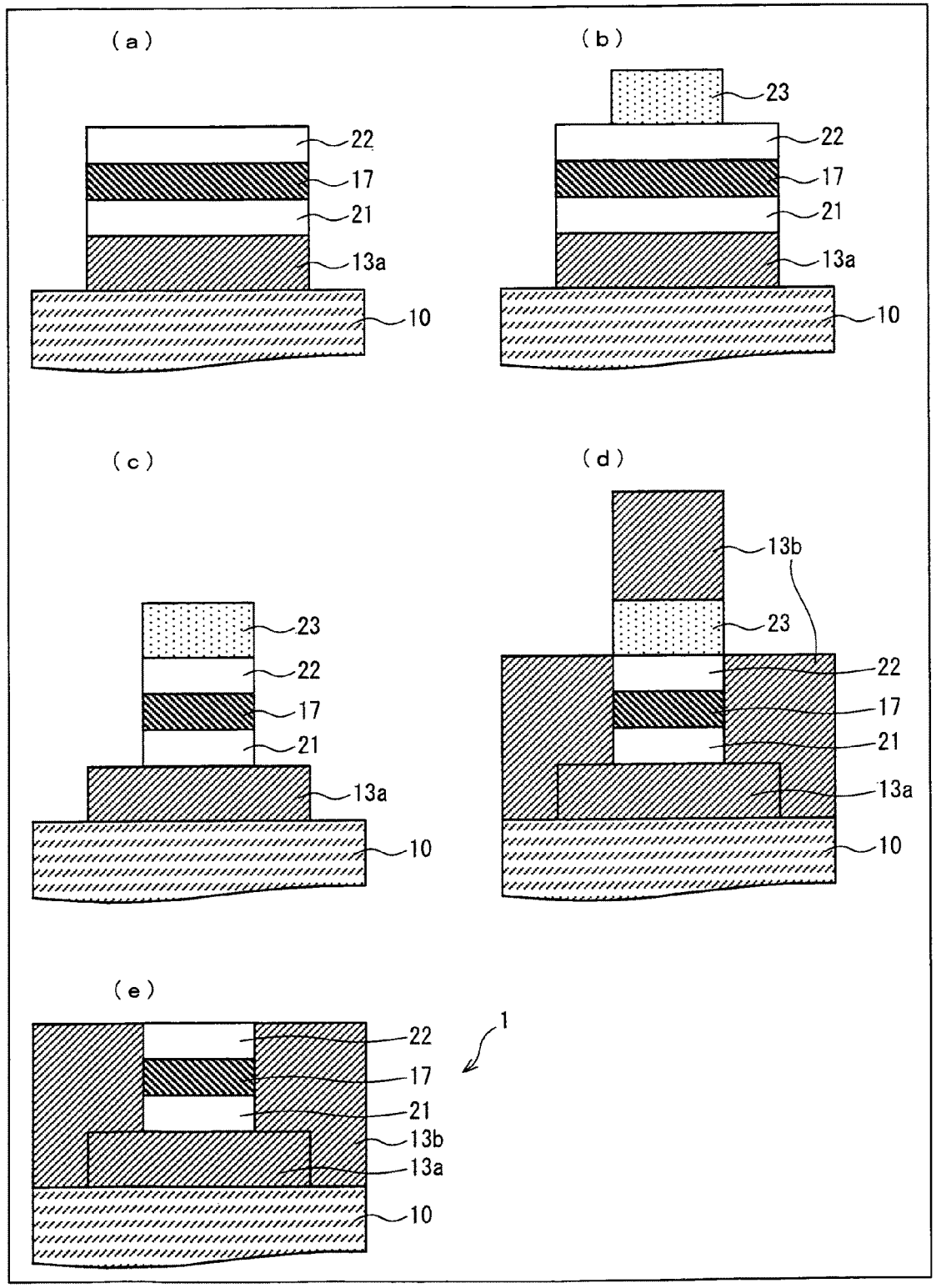
FIG. 2

(a) through (e) of FIG. 2 are views illustrating a method of producing the electromagnetic field generating element.

FIG. 3

Figure 3:
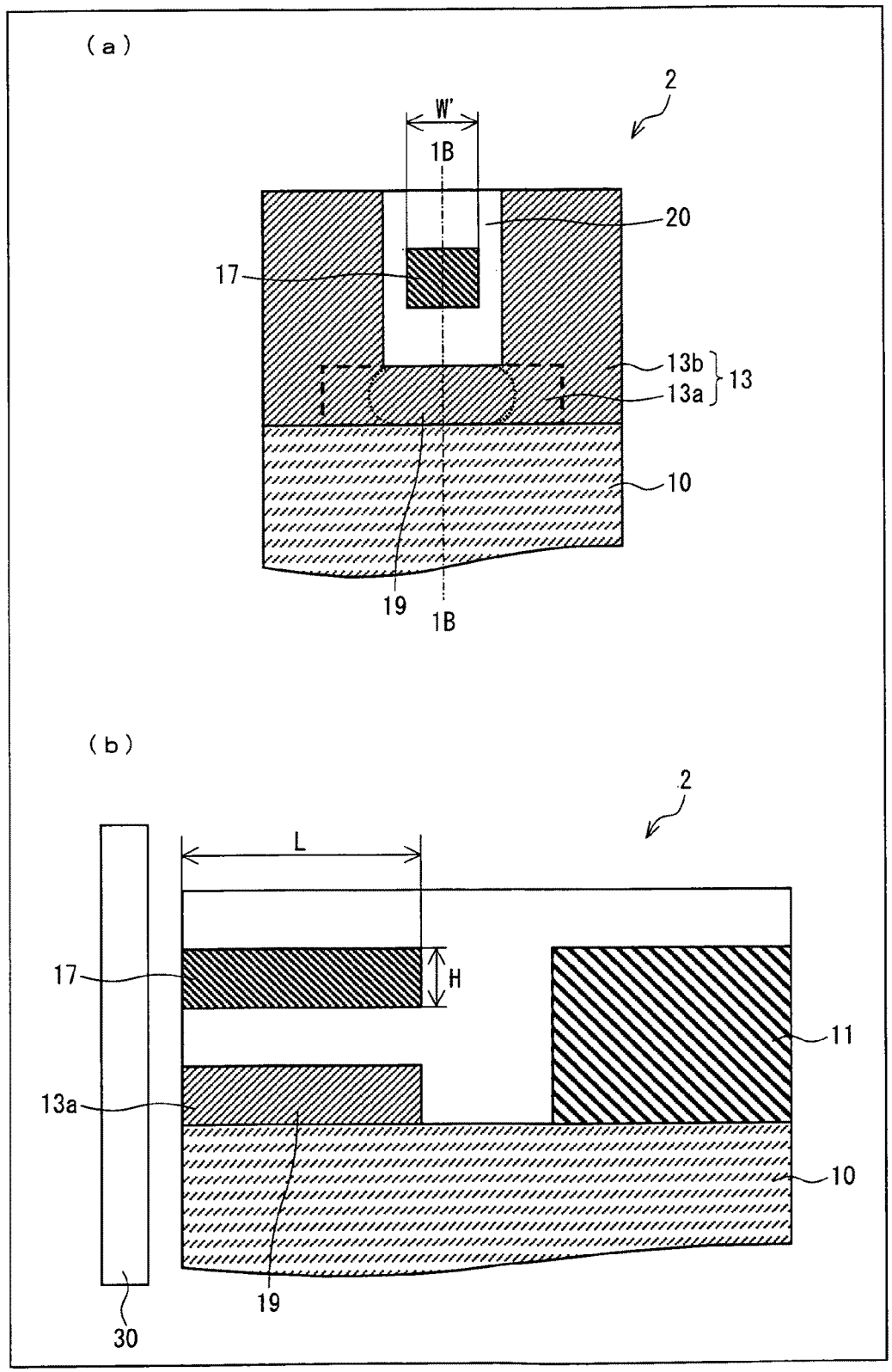

FIG. 3 illustrates an embodiment of the present invention, where (a) of FIG. 3 is an elevational view of another electromagnetic field generating element of the present invention and (b) of FIG. 3 is a cross-sectional view taken along line 1B-1B in (a) of FIG. 3.

FIG. 4

Figure 4:
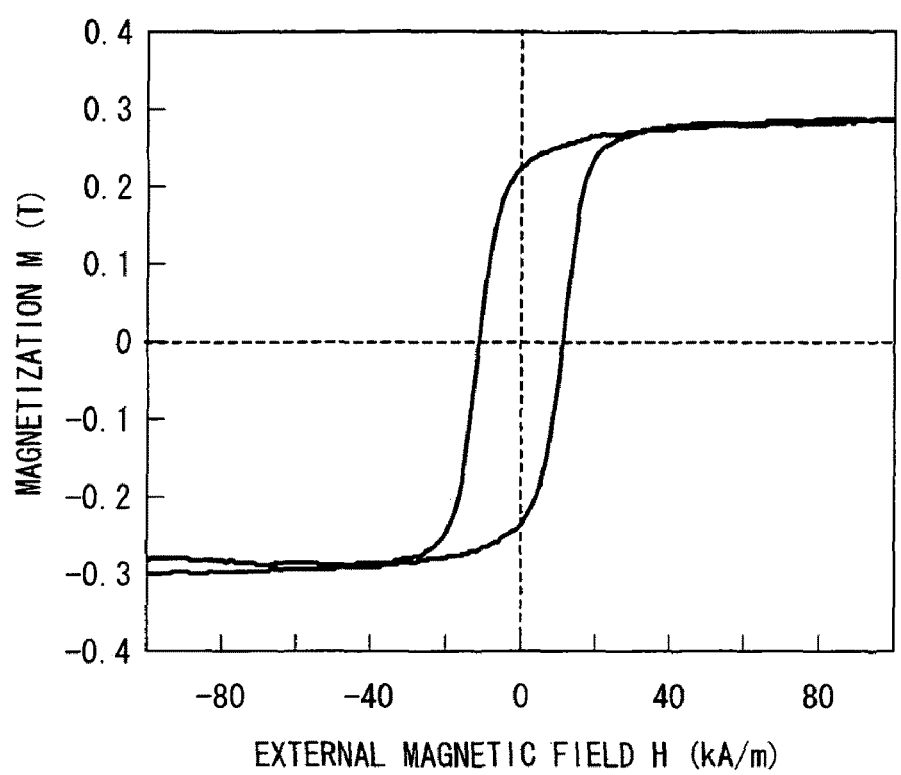

FIG. 4 is a graph illustrating a result of measurement of magnetic characteristics of manganese zinc ferrite.

FIG. 5

Figure 5:
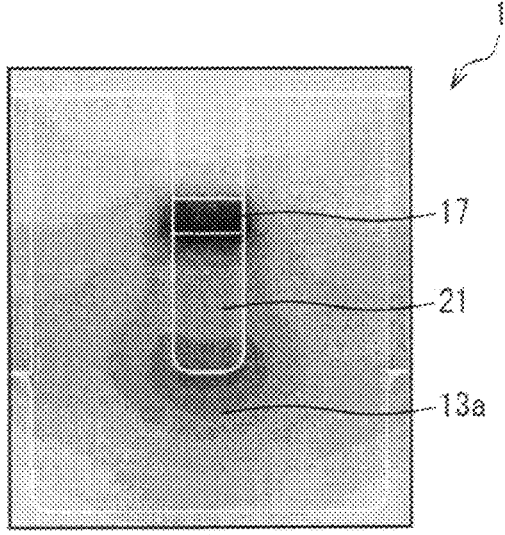
Figure 5:
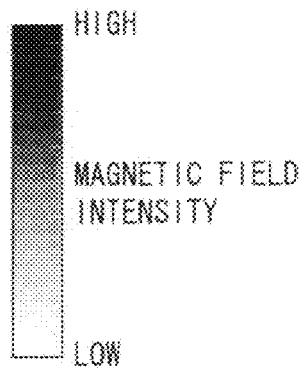
Figure 5:
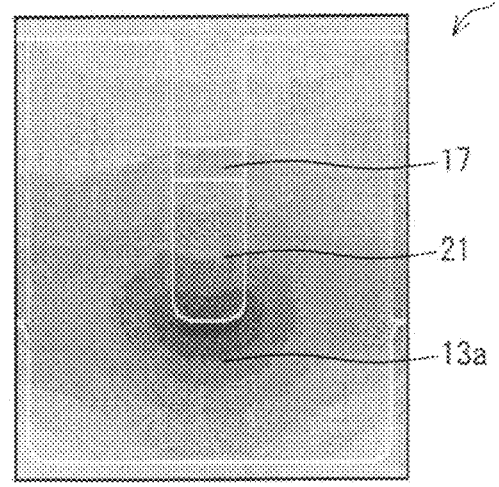
Figure 5:
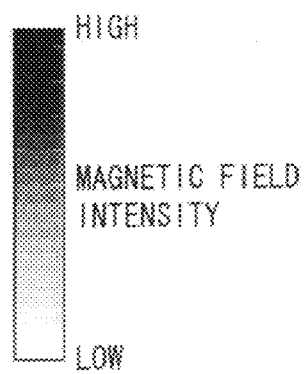

(a) of FIG. 5 is an elevational view of the electromagnetic field generating element, the view illustrating how a magnetic field is generated when a current of 100 mA is applied, and (b) of FIG. 5 is a view illustrating how a magnetic field is generated when the relative magnetic permeability μr of the soft magnetic body of the electromagnetic field generating element of (a) of FIG. 5 is changed to 1.

FIG. 6

Figure 6:
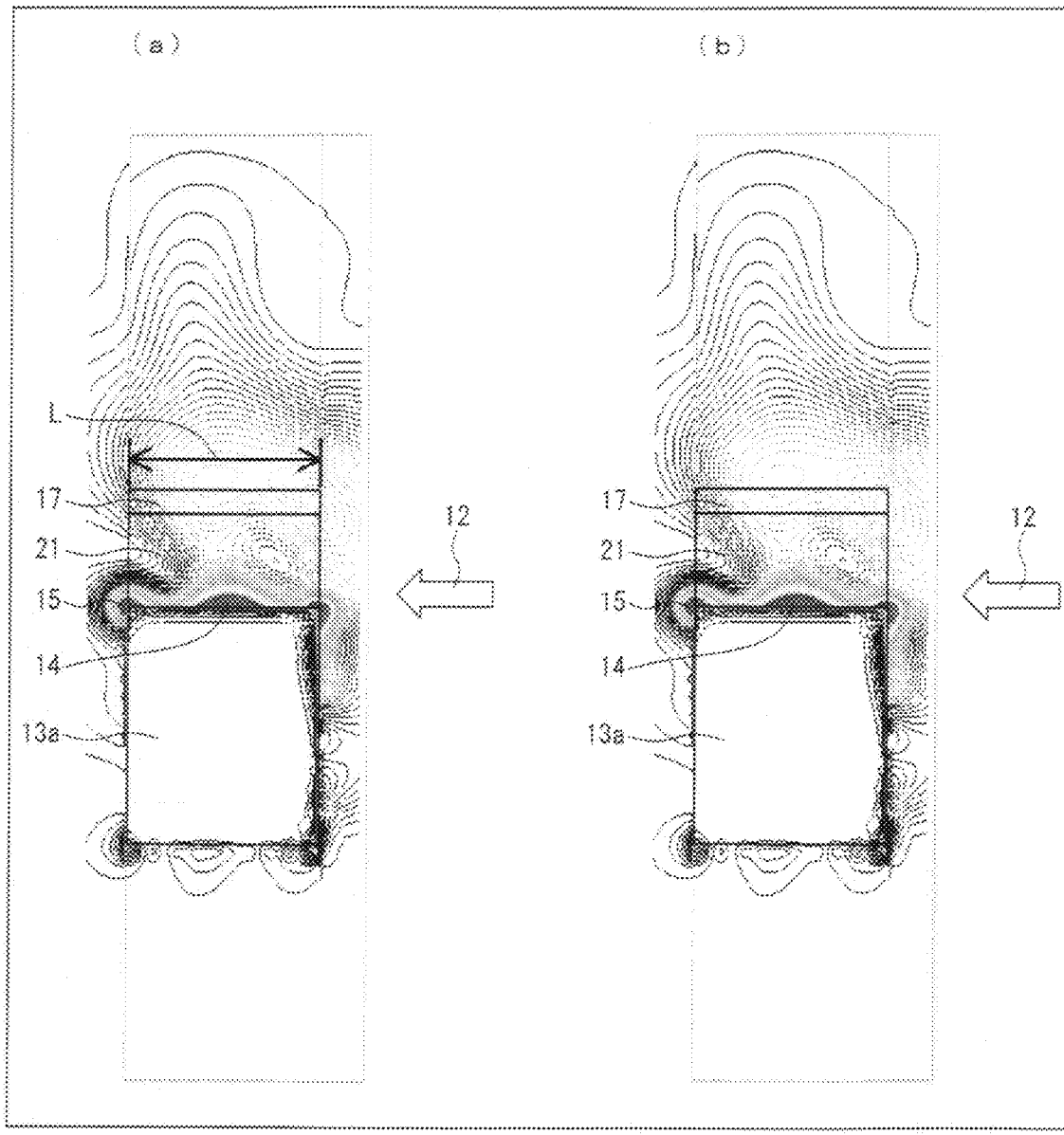

(a) of FIG. 6 is an elevational view of the electromagnetic field generating element, the view illustrating a result of an FDTD simulation of generation of near-field light generated by the electromagnetic field generating element, and (b) of FIG. 6 is a view illustrating how a near-field light is generated when the relative magnetic permeability μr of the soft magnetic body of the electromagnetic field generating element of (a) of FIG. 6 is changed to 1.

FIG. 7

Figure 7:
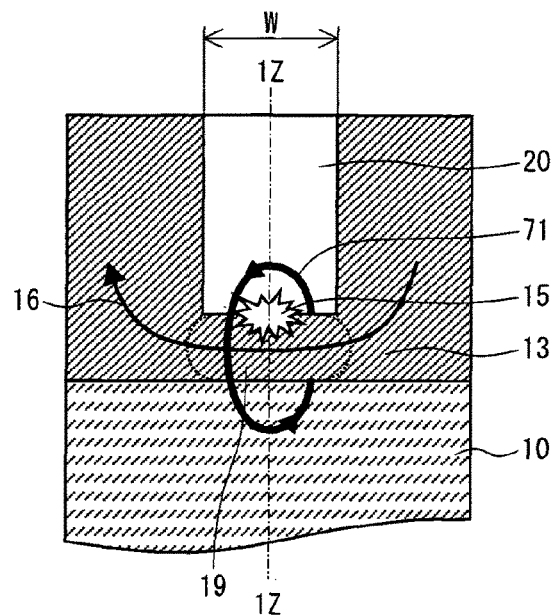
Figure 7:
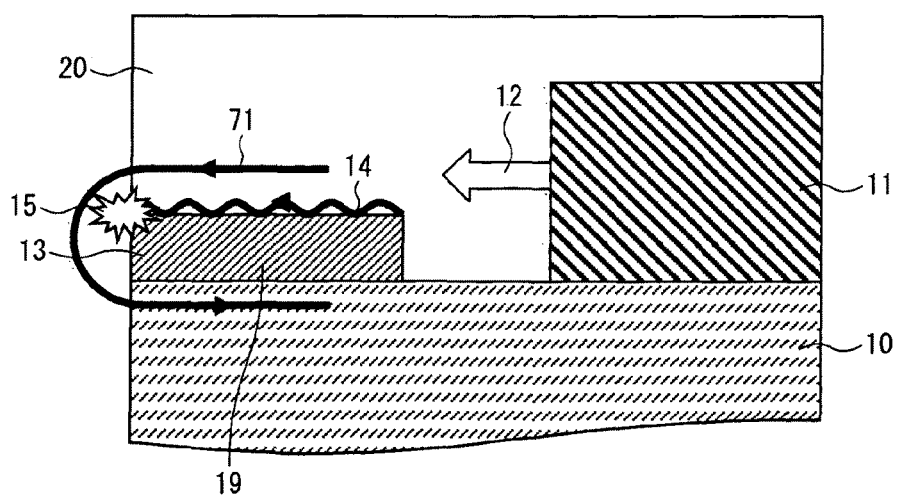

(a) of FIG. 7 is an elevational view of an electromagnetic field generating element, which is a modification of an electromagnetic field generating element of Patent Literature 2, and (b) of FIG. 7 is a cross-sectional view taken along line 1Z-1Z in (a) of FIG. 7.

FIG. 8

Figure 8:
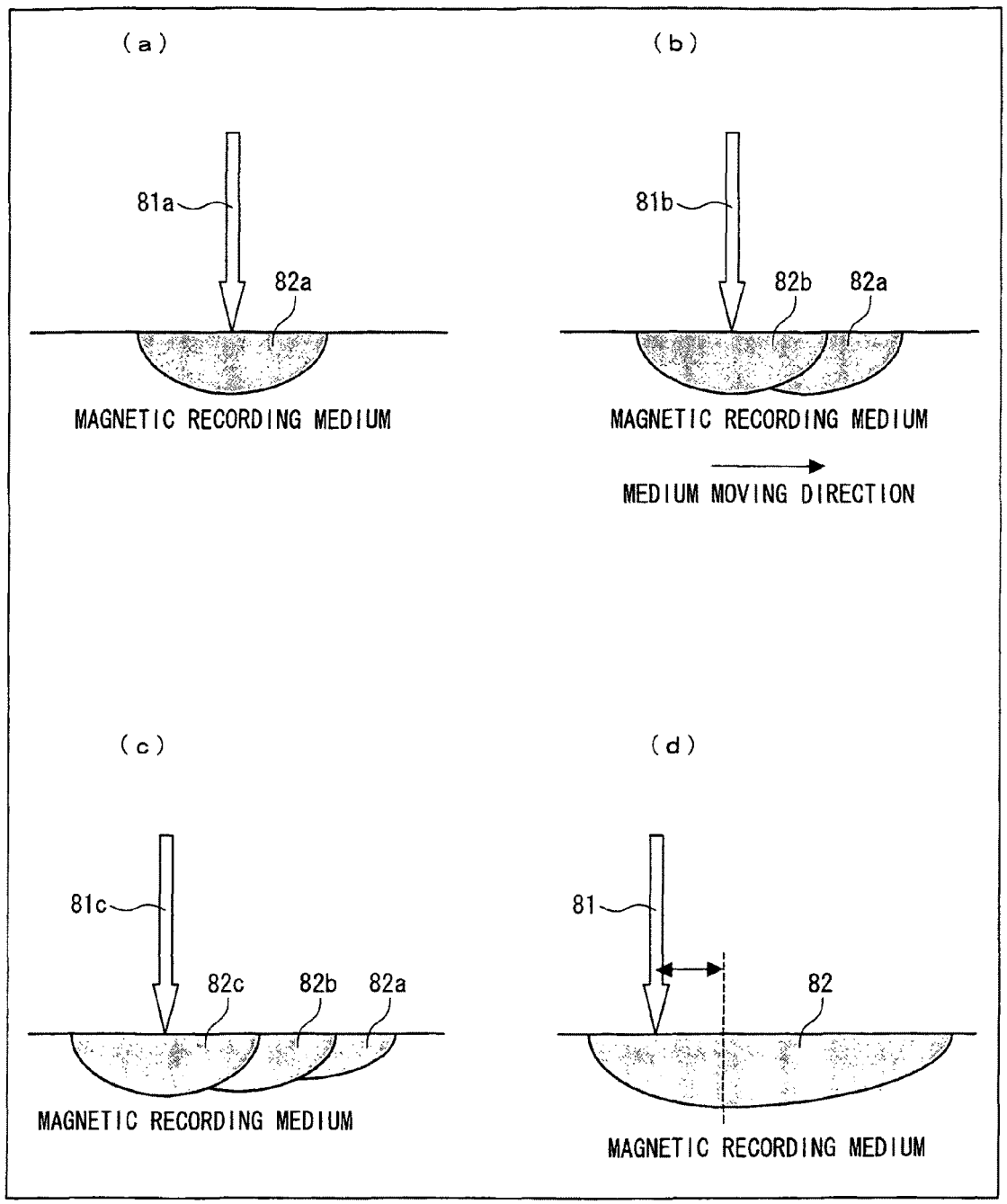

(a) through (d) of FIG. 8 is an explanatory view of the reason why an information recording and reproduction head including the electromagnetic field generating element of (a) and (b) of FIG. 7 causes a positional difference between an area irradiated with light and an area having a temperature that has been raised to the largest extent by light irradiation.

FIG. 9

Figure 9:
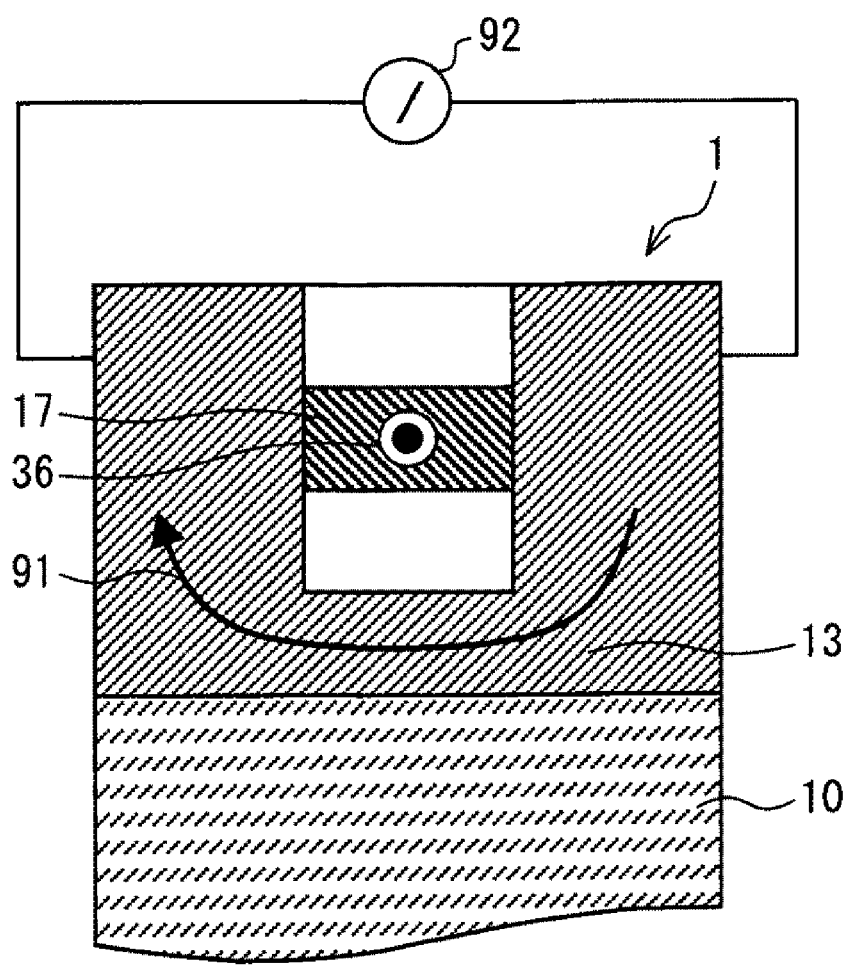

FIG. 9 is a view of a schematic arrangement of an information recording and reproduction head of the present invention, the view illustrating a manner in which the electromagnetic field generating element reads data written on a desired area of a magnetic recording medium.

FIG. 10

Figure 10:
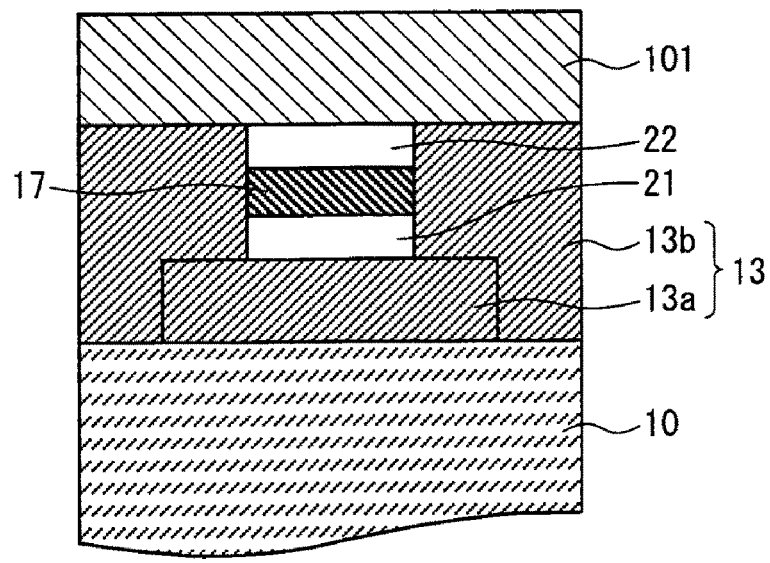

FIG. 10 is a view of a schematic arrangement of another information recording and reproduction head of the present invention, the view illustrating another manner in which the electromagnetic field generating element reads data written on a desired area of a magnetic recording medium.

FIG. 11

Figure 11:
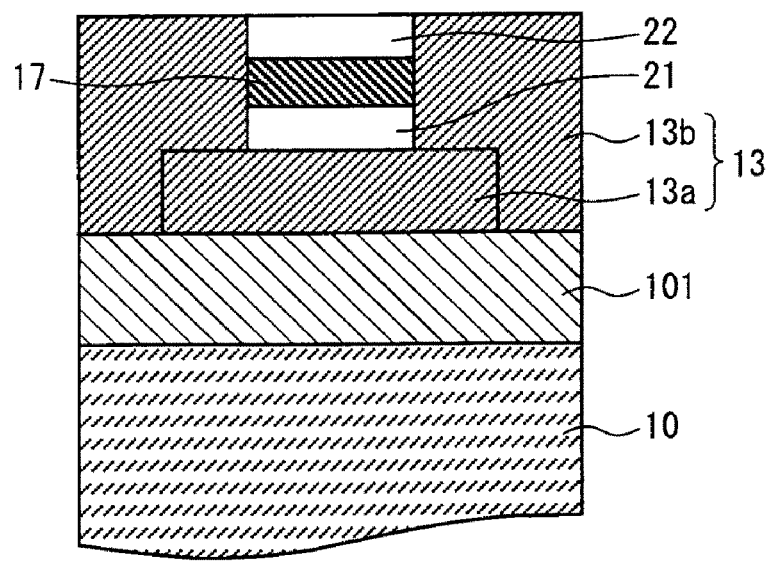

FIG. 11 is a view of a schematic arrangement of still another information recording and reproduction head of the present invention, the view illustrating still another manner in which the electromagnetic field generating element reads data written on a desired area of a magnetic recording medium.

FIG. 12

Figure 12:
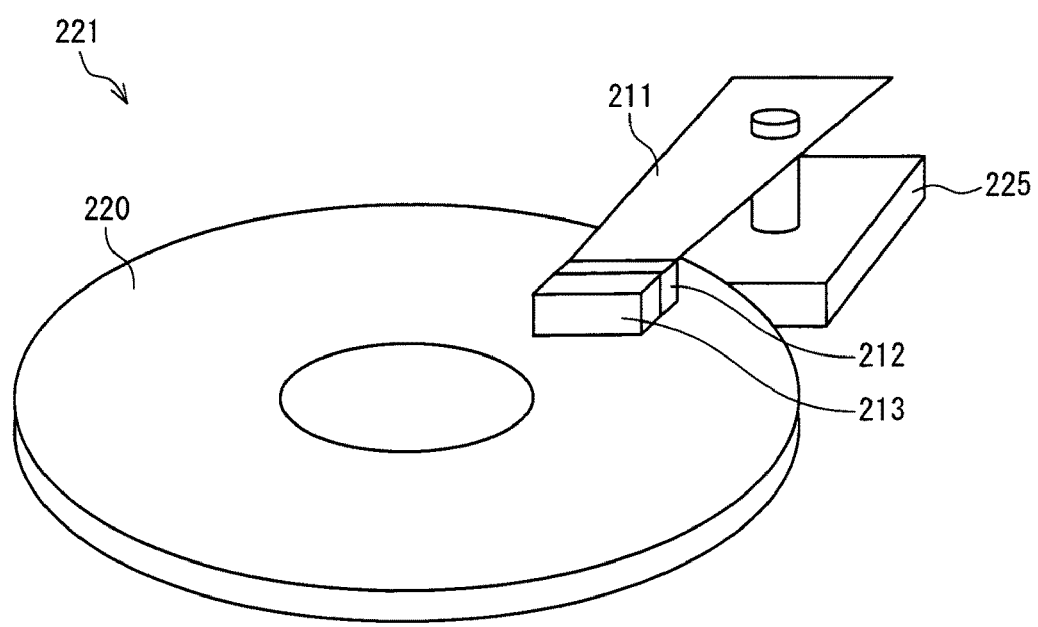

FIG. 12 is a perspective view of an arrangement of main members of an information recording and reproduction device of the present invention.

FIG. 13

Figure 13:
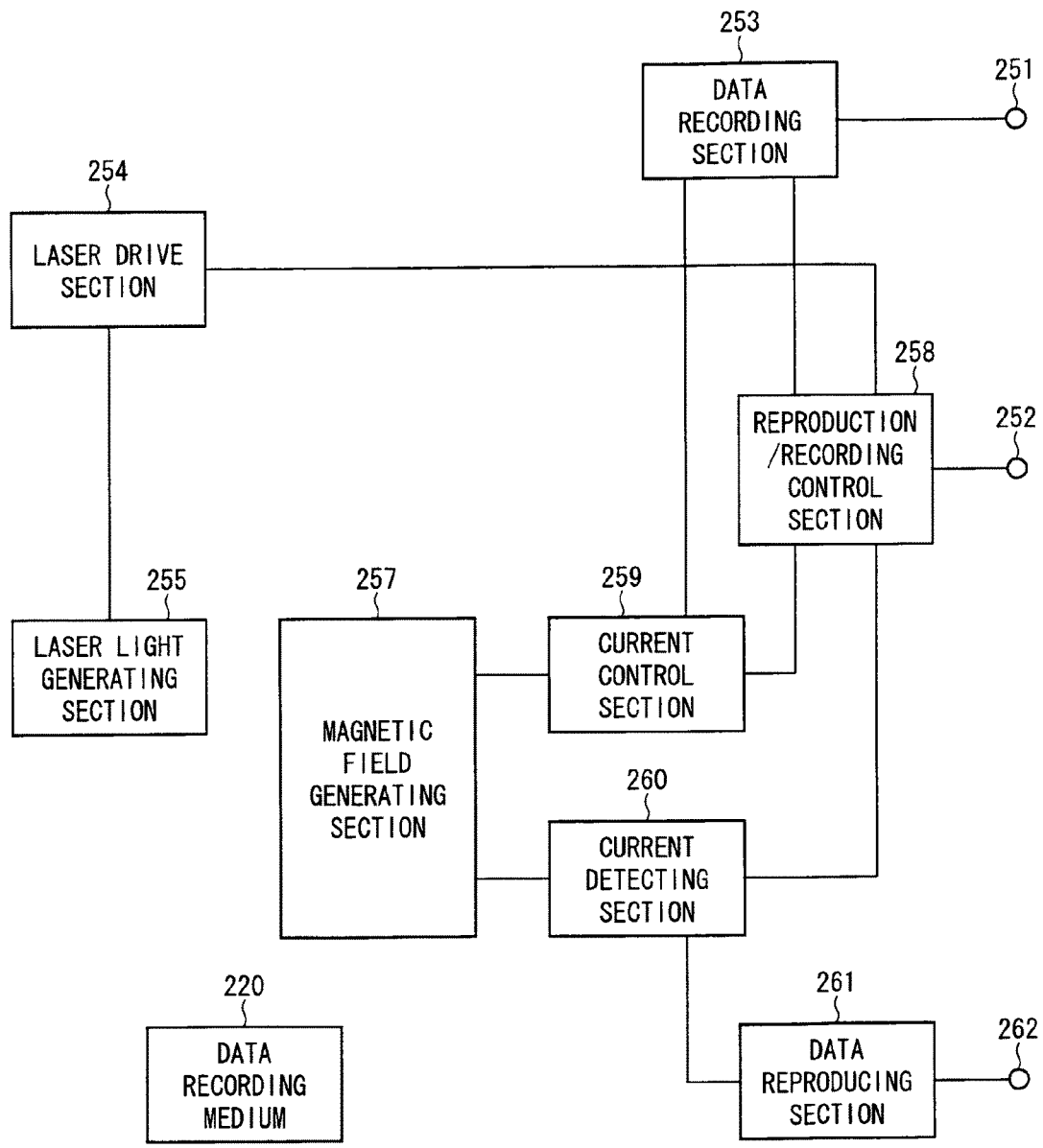

FIG. 13 is a block diagram illustrating an arrangement of a reproduction/recording system of the information recording and reproduction device of the present invention.

DESCRIPTION OF EMBODIMENTS

Embodiment 1

First, an electromagnetic field generating element of the present invention is described below with reference to FIGS. 1 through 3.

Figure 1:
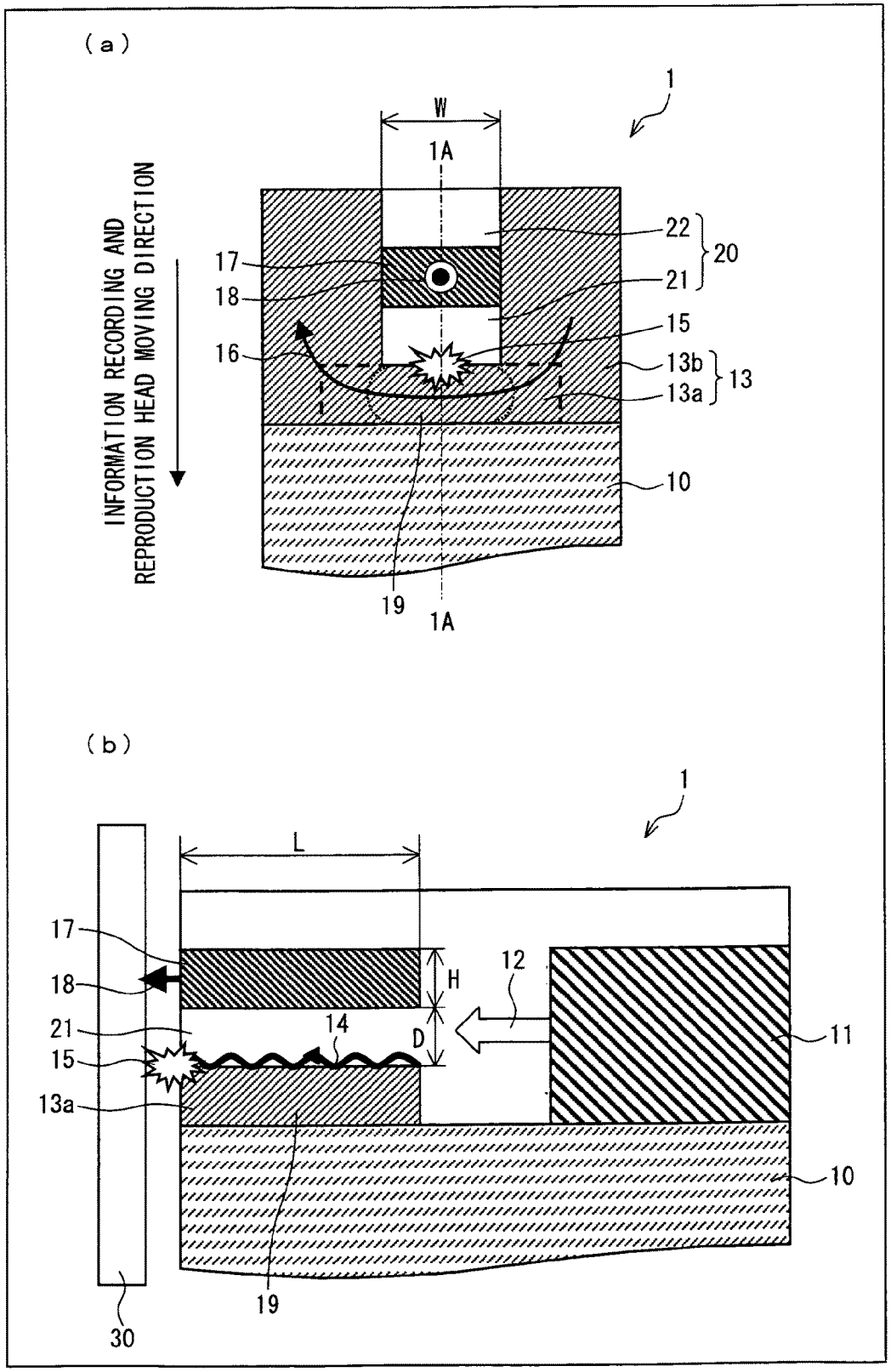
FIG. 1

(a) of FIG. 1 is an elevational view of the electromagnetic field generating element of the present invention. The elevational view illustrates a surface of the electromagnetic field generating element included in an information recording and reproduction head (described below) of the present invention, the surface facing a magnetic recording medium (object). (b) of FIG. 1 is a schematic cross-sectional view taken along line 1A-1A of (a) of FIG. 1.

For clear illustration of the structure of the electromagnetic field generating element of the present invention, neither (a) of FIG. 1 nor (a) of FIG. 3 referred to below illustrates a magnetic recording medium.

The present specification uses units all in conformity with the International System of Units. Further, in the present specification, "coercive force" and "intensity of a magnetic field" are measured uniformly in A/m (including kA/m), whereas "magnetic field", "magnetic flux density", and "magnetization" are measured uniformly in tesla (T).

Also, in the present specification, the "intensity (A/m) of a magnetic field" refers to the amount of a magnetic field generated by an electric current flowing through a conductor, whereas the "magnetization (T)" refers to an amount obtained by multiplication of "intensity of a magnetic field" by the magnetic permeability of a soft magnetic body.

Further, the "magnetic field (T)", represented by the magnetic flux density of the soft magnetic body, refers to an amount obtained by addition of "magnetization" to an amount obtained by multiplication of the "intensity of a magnetic field" by the magnetic permeability of a vacuum. However, the amount obtained by multiplication of the "intensity of a magnetic field" by the magnetic permeability of a vacuum is quite small as compared to the "magnetization." Therefore, the amount of "magnetization" substantially equals the amount of "magnetic field." The present specification refers to the "magnetization" as the "magnetic field" generated by the electromagnetic field generating element of the present invention.

As illustrated in (a) and (b) of FIG. 1, the electromagnetic field generating element 1 includes: a semiconductor laser section 11; and a conductor 13 disposed in the form of a layer on a substrate 10.

The conductor 13 is made up of: a lower conductor 13a disposed in the form of a layer on the substrate 10; and an upper conductor 13b disposed in the form of a layer on a part of the lower conductor 13a and the substrate 10. The present description deals with the conductor 13 made up of the two members, the lower conductor 13a and the upper conductor 13b. However, the arrangement of the conductor 13 is not limited to this; it is clear that the conductor 13 may be provided as a single member having a shape described below. In view of this, (a) of FIG. 1 and (a) of FIG. 3 referred to below each use, for convenience, a dashed line to illustrate the boundary between the lower conductor 13a and the upper conductor 13b. The conductor 13 has a groove section formed by the lower conductor 13a and the upper conductor 13b. The groove section is open in the direction perpendicular to (i) the direction in which the conductor 13 faces a magnetic recording medium 30 and to (ii) the direction in which a current 16 flows, and extends in the direction in which the conductor 13 faces the magnetic recording medium 30. The phrase "the direction in which the conductor 13 faces the magnetic recording medium 30" used herein refers to the direction in which the linear distance between the magnetic recording medium 30 and the conductor 13 is shortest. The lower conductor 13a forming the groove section corresponds to a constricted portion 19 of the conductor 13. The current 16 through the conductor 13 is caused to have a narrowed path at the constricted portion 19.

The groove section has a gap 20. The gap 20 is filled with silicon oxide ($SiO_2$), for example. The measurement of the gap 20 in the direction in which the current 16 flows, i.e., the width W of the gap 20 illustrated in (a) of FIG. 1, is on the order of 200 nm.

The conductor 13 is made of a metal having high electrical conductivity, such as Au, Pt, Ag, and Cu. The substrate 10 is made of a material such as: a group-IV semiconductor such as Si, and Ge; a group-III-V compound semiconductor such as GaAs, AlGaAs, GaN, InGaN, InSb, GaSb, and AlN; a group-II-VI compound semiconductor such as ZnTe, ZeSe, ZnS, and ZnO; an oxide insulator such as ZnO, $Al_2O_3$, and $SiO_2$; a nitride insulator such as SiN; glass; or plastic.

The electromagnetic field generating element 1 includes a soft magnetic body 17 in the gap 20. The soft magnetic body 17 is made, for example, of a magnetic substance having a low coercive force of 63.7 kA/m (0.08 T) or less. The soft magnetic body 17 illustrated in (a) and (b) of FIG. 1 has a measurement in the direction in which the current 16 flows, i.e., a width, equal to the width W of the gap 20 illustrated in (a) of FIG. 1. The soft magnetic body 17 illustrated in (a) and (b) of FIG. 1 has a measurement in the direction in which the soft magnetic body 17 faces the magnetic recording medium 30, the measurement being indicated as L in (b) of FIG. 1. Also, the soft magnetic body 17 illustrated in (a) and (b) of FIG. 1 has a measurement in the direction perpendicular to (i) the direction in which the soft magnetic body 17 faces the magnetic recording medium 30 and to (ii) the direction in which the current 16 flows, i.e., a height (thickness), the measurement being indicated as H in (b) of FIG. 1. The soft magnetic body 17 and the lower conductor 13a are a distance apart from each other, the distance being indicated as D in (b) of FIG. 1.

As mentioned above, the width W of the gap 20 illustrated in (a) of FIG. 1 is on the order of 200 nm. In contrast, the semiconductor laser section 11 emits light having a wavelength of 400 nm or more. Therefore, the light 12 is unable to enter the gap 20. However, the light excites a surface plasmon 14 on a surface of the constricted portion 19, i.e., on the upper end surface of the lower conductor 13a. The surface plasmon 14 thus excited is transmitted to an end of the constricted portion (i.e., to a left end portion of the electromagnetic field generating element 1 illustrated in (b) of FIG. 1). The surface plasmon 14, after being transmitted to the end of the constricted portion 19, causes light to be emitted as near-field light 15. The electromagnetic field generating element 1 applies the current 16 to the constricted portion concurrently with the emission of the light 12. The current 16 thus applied generates a magnetic field (not shown) in the vicinity of the constricted portion 19.

In the electromagnetic field generating element 1, the magnetic field then magnetizes the soft magnetic body 17.

The soft magnetic body 17 is provided in the gap 20 as a member having the width W, the length L, and the height H that satisfy both of the following inequalities:

$$\text{length } L > \text{width } W, \text{ length } L > \text{height } H.$$

The reason for this is as follows:

When the above inequalities are both satisfied, the soft magnetic body 17 has magnetic anisotropy in which its easy direction of magnetization coincides with the direction of the length L, i.e., the direction in which the soft magnetic body 17 faces the magnetic recording medium 30 when the electromagnetic field generating element 1 is included in an information recording and reproduction head. In general, the magnetization direction of a magnetic body tends to coincide with its easy direction of magnetization. While the magnetic field generated at the constricted portion 19 is in a cyclic shape and therefore has various magnetization directions, the soft magnetic body 17, when the above inequalities are both satisfied, has a magnetization direction extending toward the magnetic recording medium 30.

This allows the soft magnetic body 17 to have the magnetic anisotropy in which its easy direction of magnetization coincides with the direction of the length L, i.e., the direction in which the soft magnetic body 17 faces the magnetic recording medium 30 when the electromagnetic field generating element 1 is included in an information recording and reproduction head. This in turn causes the soft magnetic body 17 to be magnetized preferentially in the direction of the length L. As a result, the soft magnetic body 17 generates a magnetic field 18 extending in the direction of the length L and having an intensity in proportion to the following formula:

(intensity of a magnetic field generated by the current 16)×(magnetic permeability µ of the soft magnetic body 17).

The magnetic field 18 is applied to a variable area depending on the width W and the height H of the soft magnetic body 17. This will be detailed below. The soft magnetic body 17 maintains the magnetic field 18 while in magnetization. Therefore, while the current 16 needs to be applied to the constricted portion 19 for a reversal of the direction of the magnetic field 18, it does not need to be applied on every occasion of generating a magnetic field.

In the case of a rapid recording operation, the length L is preferably smaller than the width W. The soft magnetic body satisfying the foregoing relation has its easy direction of magnetization that does not coincide with the direction of the length L. This causes substantially no remanent magnetization in the direction of the length L. This in turn facilitates magnetization reversal with respect to the direction of the length L and also improves the frequency characteristics of the magnetization reversal. Therefore, the above arrangement is suitable for rapid recording.

In other words, the soft magnetic body 17 is preferably a member having a length L and a width W that are different from each other. The provision of the soft magnetic body 17 allows the electromagnetic field generating element 1 as well as an electromagnetic field generating element 2 (described below; see (a) and (b) of FIG. 3) to appropriately apply a magnetic field during recording.

The following description deals with a method of producing the electromagnetic field generating element 1. The description concerns how the constricted portion 19 is formed and how the soft magnetic body 17 is disposed, both of which make the electromagnetic field generating element 1 different from electromagnetic field generating elements of conventional arts.

As illustrated in (a) of FIG. 2, the production of the electromagnetic field generating element 1 starts with formation of a multilayer film on the substrate 10, the multilayer film being formed by successively stacking: the lower conductor 13a forming the constricted portion 19; a lower $SiO_2$ layer 21 provided below the soft magnetic body 17 to form the gap 20; the soft magnetic body 17; and an upper $SiO_2$ layer 22 provided above the soft magnetic body 17 to form the gap 20.

Then etching or lift-off is performed by photolithography so that a pattern is formed, the pattern outlining the width (along the direction of the width W of the gap 20) and the depth (along the direction of the length L of the soft magnetic body 17) of the constricted portion 19. Next, a resist layer 23 having a pattern outlining the width and the depth of the constricted portion 19 is formed (see (b) of FIG. 2). After that, etching is performed so that the lower $SiO_2$ layer 21, the soft magnetic body 17, and the upper $SiO_2$ layer 22 are partially removed (see (c) of FIG. 2). The etching is ended concurrently with or immediately after its arrival at the lower conductor 13a. Finally, the upper conductor 13b is formed (see (d) of FIG. 2), and the resist layer 23 is removed by lift-off (see (e) of FIG. 2). The electromagnetic field generating element 1 is produced as described above according to the production method.

Both of the lower conductor 13a and the upper conductor 13b are preferably made of Au (gold). Au has a high extinction coefficient k and is therefore suitable for plasmon transmission (plasmon propagation). Apart from Au, a material having a high extinction coefficient k, such as Ag (silver) or Al (aluminum), may also be used.

The lower $SiO_2$ layer 21 and the upper $SiO_2$ layer 22 may each be substituted by a layer that is made of a material having a low extinction coefficient k, such as AlN (aluminum nitride).

The above method of producing the electromagnetic field generating element 1 is easy to implement and excellent in productivity. When the electromagnetic field generating element 1 is produced in accordance with the production method, the soft magnetic body 17 is preferably made of a soft magneto-insulator and is more preferably made of a highly insulating ferrite such as manganese zinc ferrite ($Mn_{0.5}Zn_{0.5}Fe_2O_4$) so that short circuits between the soft magnetic body 17 and the upper conductor 13b are prevented. This will be detailed below.

As is indicated in (a) and (b) of FIG. 3 each illustrating an electromagnetic field generating element 2, the soft magnetic body 17 and the conductor 13 are preferably separated from each other. The state in which "the soft magnetic body 17 and the conductor 13 are separated from each other" refers to the state in which the soft magnetic body 17 and the conductor 13 are disposed, for example, 10 nm or more apart from each other, so that there occurs substantially no charge transfer between them arising from a tunnel current, discharge or the like. The electromagnetic field generating element 2 illustrated in (a) and (b) of FIG. 3 includes a soft magnetic body 17 having a width W' smaller than the width W of the gap 20. The provision of the soft magnetic body 17 allows for achievement of the state in which "the soft magnetic body 17 and the conductor 13 are separated from each other." This prevents short-circuiting of a current flowing through the constricted portion 19 even in the case where the soft magnetic body 17 is made of a conductor. Thus, the soft magnetic body 17 of the electromagnetic field generating element 2 illustrated in (a) and (b) of FIG. 3 may be made of a material such as: a metallic magnetic material including Fe, Co, and Ni; or a compound containing at least one of the above metallic magnetic materials. The metallic magnetic materials are each excellent in magnetic characteristics such as magnetic permeability µ and saturation magnetization. Using such metallic magnetic materials for the soft magnetic body 17 easily allows the soft magnetic body 17 to generate an improved magnetic field. It should be noted that this arrangement necessitates forming a further $SiO_2$ layer on each side of the soft magnetic body, for example, by photolithography in the step of forming a multilayer film illustrated in (a) of FIG. 2.

An information recording and reproduction head including the electromagnetic field generating element 1 causes a positional difference between (i) an area of the magnetic recording medium 30, the area being irradiated with light, and (ii) an area of the magnetic recording medium 30, the area having the largest temperature rise. The positional difference ranges from 10 nm to 200 nm, depending on the rotation rate (linear velocity) of the magnetic recording medium 30. Disposing the soft magnetic body 17 and the bottom portion of the conductor 13 so that the distance between them is not less than 10 nm and not more than 200 nm allows for optimization of the distance between (i) an area to which a magnetic field is applied and (ii) the area irradiated with near-field light, in correspondence with the rotation rate (linear velocity) of the magnetic recording medium 30. Therefore, the distance between the soft magnetic body 17 and the bottom portion (i.e., constricted portion 19) of the conductor 13, i.e., the distance D in (b) of FIG. 1, is preferably not less than 10 nm and not more than 200 nm. In other words, the soft magnetic body 17 is preferably positioned in correspondence with the linear velocity of the magnetic recording medium 30.

The soft magnetic body 17 preferably has a thickness (i.e., height H of the soft magnetic body illustrated in (b) of FIG. 1) not less than 10 nm and not more than 1000 nm so as to suitably induce a magnetic field. A soft magnetic body 17 having a thickness of less than 10 nm has an excessively high coercive force, which impedes magnetization reversal of such a soft magnetic body 17. On the other hand, a soft magnetic body 17 having a thickness of more than 1000 nm applies a magnetic field having an area of more than 1000 nm to the magnetic recording medium 30. This excessively large area of a magnetic field is undesirable; it causes an information recording and reproduction head including the electromagnetic field generating element 1 to form large magnetic bits on the magnetic recording medium 30. Such an information recording and reproduction head is unsuitable for high-density recording. In view of the above, the soft magnetic body 17 preferably has a thickness in the range of 10 to 1000 nm.

The soft magnetic body 17 preferably has saturation magnetization not less than 0.2 T and not more than 1 T. When optically assisted magnetic recording is performed using an information recording and reproduction head including the electromagnetic field generating element 1, a portion of the magnetic recording medium 30, the portion having been provided with optical assistance, normally has a coercive force of about 159 kA/m (equivalent to 0.2 T). This requires magnetization of 159 kA/m or more, i.e., 0.2 T or more, for performing recording. A soft magnetic body 17 having saturation magnetization of more than 1 T may cause recording to be performed merely with its own magnetization, regardless of whether or not optical assistance is provided. Therefore, the soft magnetic body 17 most suitably has saturation magnetization of not less than 0.2 T and not more than 1 T for performing high-density magnetic recording by means of optically assisted magnetic recording.

Embodiment 2

With reference to FIG. 4, the following description deals with production and results of characteristic evaluation of the soft magnetic body included in the above electromagnetic field generating element, the soft magnetic body being made of manganese zinc ferrite, which is a soft magneto-insulator. Among other ferrites, manganese zinc ferrite has a high magnetic permeability, high magnetization, and low coercive force. Such a material is suitable for the core material of a magnetic body.

The description here deals with the production and the results of characteristic evaluation concerning the case of, for example, using manganese zinc ferrite as the material of the soft magnetic body 17 included in the electromagnetic field generating element 1 illustrated in (a) and (b) of FIG. 1. It is clear that the electromagnetic field generating element 2 illustrated in (a) and (b) of FIG. 3 may also use manganese zinc ferrite as the material of the soft magnetic body 17.

Manganese zinc ferrite was deposited on a glass substrate by pulsed laser deposition (PLD) to form a manganese zinc ferrite film serving as the soft magnetic body 17. The glass substrate on which the manganese zinc ferrite film was deposited was heated to 400° C. in vacuum for a two-hour annealing process.

FIG. 4 is a graph illustrating the magnetic characteristics of the manganese zinc ferrite film thus formed. The graph of FIG. 4 shows magnetization curves (M-H curves showing the relationship between the magnetization M and the intensity H of an externally applied magnetic field) representing the magnetic characteristics of the manganese zinc ferrite film. The magnetic characteristics have been obtained with use of a vibrating sample magnetometer (VSM) with a measurement temperature of the manganese zinc ferrite film being 175° C. According to the M-H curves of FIG. 4, the manganese zinc ferrite film exhibited the following characteristics: a relative magnetic permeability $\mu r$ of about 10, i.e., a magnetic permeability $\mu$ of about $1.26 \times 10^{-5}$ H/m; a coercive force of about 10.9 kA/m (equivalent to 0.0138 T); and saturation magnetization of about 0.3 T.

The manganese zinc ferrite film having the characteristics illustrated in the graph of FIG. 4 undergoes a magnetization reversal when a magnetic field generated by the current 16 through the constricted portion 19 has an intensity of 8.75 kA/m or more. The manganese zinc ferrite film having undergone a magnetization reversal generates a magnetic field 18 of about 0.3 T, which is sufficient for a magnetization reversal of the magnetic recording medium 30.

The manganese zinc ferrite film is a semitransparent film having a refractive index n of 2.3 and an extinction coefficient k of 1.0. Thus, even in the case where the constricted portion 19 and the soft magnetic body 17 are in contact with each other, the transmission of the surface plasmon 14 is not prevented.

Next, measurements were made of the electrical resistance of the manganese zinc ferrite film. The sheet resistance was measured by the four-terminal method. The measurement showed that the manganese zinc ferrite film had a resistivity $\rho$ of about 1 Ωcm. The resistivity of the manganese zinc ferrite film is sufficiently high as mentioned above. Thus, even in the case where the soft magnetic body 17, made of the manganese zinc ferrite film, and the upper conductor 13b are in contact with each other, there occurs no short-circuiting of the current 16.

As is clear from the above, the soft magnetic body of each of the electromagnetic field generating elements of the present invention is preferably a soft magneto-insulator such as a manganese zinc ferrite film, and is more preferably a soft magneto-insulator containing a ferrite.

Embodiment 3 and Comparative Example 1

With reference to FIG. 5, the following description deals with a result of a simulation of a magnetic field generated by the electromagnetic field generating element 1.

(a) of FIG. 5 is an elevational view of the electromagnetic field generating element 1 illustrated in (a) of FIG. 1. The view illustrates how a magnetic field was generated when a current of 100 mA was applied as the current 16. Note that the following is assumed in the description here with respect to the electromagnetic field generating element 1: (i) the relative magnetic permeability µr of the soft magnetic body 17 is 10, i.e., the magnetic permeability µ of the soft magnetic body 17 is about $1.26 \times 10^{-5}$ H/m; and (ii) the distance D between the soft magnetic body 17 and the lower conductor 13a is 200 nm, i.e., the thickness of the lower $SiO_2$ layer 21 is 200 nm.

As is clear from (a) of FIG. 5, the magnetic field generated by the electromagnetic field generating element 1 was highest at the position of the soft magnetic body 17. This indicates that the use of the soft magnetic body 17 allowed (i) reinforcement of the magnetic field and (ii) control of the position at which the magnetic field was generated (stated differently, the position at which the magnetic field is highest). Further, as is clear from (a) of FIG. 5, the soft magnetic body 17 generates the magnetic field 18 to be applied to an area having a size substantially equal to the size of the soft magnetic body 17, i.e., to an area having a width and a height that are substantially equal to the width W and the height H of the soft magnetic body 17, respectively.

In contrast, (b) of FIG. 5 illustrates how a magnetic field was generated by an electromagnetic field generating element 1', in which the relative magnetic permeability µr of the soft magnetic body 17 of (a) of FIG. 5 was changed to 1, i.e., the magnetic permeability µ was changed to about $1.26 \times 10^{-6}$ H/m. The soft magnetic body 17 had the relative magnetic permeability µr of 1 and therefore possessed substantially no characteristics of a magnetic body. Thus, the characteristics of the electromagnetic field generating element 1' illustrated in (b) of FIG. 5 substantially equal characteristics that would be possessed by the electromagnetic field generating element 1 illustrated in (a) of FIG. 5 if it lacked the soft magnetic body 17.

The electromagnetic field generating element 1' illustrated in (b) of FIG. 5 generated a magnetic field that was low and had a moderate distribution over the surface, as compared to the magnetic field generated by the electromagnetic field generating element 1 illustrated in (a) of FIG. 5. The magnetic field generated by the electromagnetic field generating element 1' illustrated in (b) of FIG. 5 was highest at the boundary between the lower conductor 13a and the lower $SiO_2$ layer 21.

Embodiment 4 and Comparative Example 2

With reference to FIG. 6, the following description deals with a result of a finite-difference time-domain (FDTD) simulation of generation of near-field light 15 by the electromagnetic field generating element 1.

An incident light, i.e., the light 12, was set to have a polarization direction along the direction of the length L of the soft magnetic body 17. The FDTD simulation was run under the following conditions: the lower $SiO_2$ layer 21 had a thickness of 200 nm; and the soft magnetic body 17 had a thickness of 50 nm, a refractive index n of 2.3, an extinction coefficient k of 1.0, and a relative magnetic permeability µr of 10.

(a) of FIG. 6 is a cross-sectional view of the electromagnetic field generating element 1. The view illustrates a cross section identical to the cross section of the electromagnetic field generating element 1 illustrated in (b) of FIG. 1. Further, (a) of FIG. 6 illustrates how the near-field light 15 is generated.

(a) of FIG. 6 demonstrates that the surface plasmon 14 was transmitted along the boundary between the lower conductor 13a and the lower $SiO_2$ layer 21 and that the near-field light 15 was caused at a left end portion of the lower conductor 13a.

As illustrated in (a) of FIG. 5, the electromagnetic field generating element 1 includes the soft magnetic body 17 so that the position at which the magnetic field 18 (not shown in (a) of FIG. 6) is generated coincides with the position of the soft magnetic body 17. Note that the position at which the magnetic field 18 is generated refers to the highest portion of the magnetic field 18.

In contrast, (b) of FIG. 6 illustrates how a near-field light was generated by the electromagnetic field generating element 1', in which the relative magnetic permeability µr of the soft magnetic body 17 of (a) of FIG. 6 was changed to 1. In other words, (b) of FIG. 6 illustrates a result of an FDTD simulation run when the soft magnetic body 17 had the relative magnetic permeability µr of 1. The soft magnetic body 17 had the relative magnetic permeability µr of 1 and therefore possessed substantially no characteristics of a magnetic body. Thus, the characteristics of the electromagnetic field generating element 1' illustrated in (b) of FIG. 6 substantially equal characteristics that would be possessed by the electromagnetic field generating element 1 illustrated in (a) of FIG. 6 if it lacked the soft magnetic body 17.

As in the case of (a) of FIG. 6, (b) of FIG. 6 demonstrates that the surface plasmon 14 was transmitted along the boundary between the constricted portion 19 and the lower $SiO_2$ layer 21 and that the near-field light 15 was caused at an end portion of the constricted portion 19. This shows, in conjunction with the result shown in (b) of FIG. 5, that the absence of the soft magnetic body 17 resulted in a substantial coincidence of the position at which the near-field light 15 was generated with the position at which the magnetic field was generated (i.e., with the position corresponding to the boundary between the lower conductor 13a and the lower $SiO_2$ layer 21).

Embodiment 5

FIG. 9 is a view illustrating how the electromagnetic field generating element 1 reads data (hereinafter referred to as "magnetic data") recorded on a desired area of the magnetic recording medium 30 (see (b) of FIG. 1). The electromagnetic field generating element 1 of FIG. 9 further includes a galvanometer (reproduction section; current measuring section) 92. The galvanometer 92 is used to measure a current flowing through the conductor 13 of the electromagnetic field generating element 1 and is therefore connected across the conductor 13.

The following description deals with a principle on which the electromagnetic field generating element 1 reads magnetic data.

The electromagnetic field generating element 1 reads magnetic data from the magnetic recording medium 30 through an operation reverse to the operation through which the electromagnetic field generating element 1 writes magnetic data on the magnetic recording medium 30.

In the above operation of reading magnetic data, a specific magnetic bit to be read among the magnetic bits (not shown) formed on the magnetic recording medium 30 comes to face the soft magnetic body 17 (i.e., the linear distance between the specific magnetic bit and the conductor 13 becomes shortest). The specific magnetic bit leaks a magnetic field, which then magnetizes the soft magnetic body 17 in the direction of the magnetic field. When this magnetization of the soft magnetic body 17 changes the magnetization direction 36 of the soft magnetic body 17, an induction current (a current flowing through the conductor) 91 is caused to flow through the conductor 13 by electromagnetic induction. The direction of the induction current 91 depends on the magnetization direction 36 of the soft magnetic body 17. For example, when the magnetization direction 36 extends toward the magnetic recording medium 30 (i.e., in the direction perpendicular to the surface of the drawing), the induction current 91 flows in the direction perpendicular to the magnetization direction 36; specifically, it flows clockwise or counterclockwise in a plane of the conductor 13, the plane being parallel to the surface of the drawing.

As such, determining the direction of the induction current 91 allows for identification of the orientation and position of the specific magnetic bit. As a result, the magnetic data is obtainable through the electromagnetic field generating element 1 by determining the variable direction of the induction current 91 through the conductor 13. This allows for achievement of the operation of reading magnetic data from the magnetic recording medium 30 with use of the electromagnetic field generating element 1.

Obtaining magnetic data from the magnetic recording medium 30 for the purpose of reproducing such magnetic data necessitates measuring the induction current 91 through the conductor 13. This measurement only requires connecting both ends of the galvanometer 92 across the conductor 13 as illustrated in FIG. 9., so that the induction current 91 through the conductor 13 is measured with the galvanometer 92.

As in the write operation, the emission of the light 12 (see (b) of FIG. 1) during the read operation allows for a rise in the temperature of only a portion of the magnetic recording medium 30, the portion corresponding to the specific magnetic bit to be read and the vicinity of the portion. This allows for achievement of an optically assisted read system. This optically assisted read system is effective, especially in the art where, among other magnetic materials for use in the recording layer of the magnetic recording medium 30, ferrimagnetic material having a compensation temperature equal to room temperature is used, for example, the art being represented by the art disclosed in Patent Literature 1.

FIG. 9 illustrates as an electromagnetic field generating element the electromagnetic field generating element 1 illustrated in (a) and (b) of FIG. 1. However, the arrangement is not limited to this; the electromagnetic field generating element 2 illustrated in (a) and (b) of FIG. 3 may also be used instead.

An information recording and reproduction head of the present invention uses either of the electromagnetic field generating elements of the present invention to simultaneously provide optical assistance and write magnetic data. In addition, the information recording and reproduction head further includes the galvanometer 92 so as to read magnetic data on the above read principle. Unlike conventional optically assisted information recording and reproduction heads, the information recording and reproduction head of the present invention requires no magnetoresistance effect element as a separate member, for the purpose of the read operation. This allows for achievement of the information recording and reproduction head with reduced costs. Further, the information recording and reproduction head of the present invention is capable of applying a high magnetic field and also applying such a magnetic field to an area of a magnetic recording medium, the area having a temperature that has been raised to the largest extent by light irradiation. This allows for achievement of an information recording and reproduction head that performs optically assisted magnetic recording at high efficiency.

The following description deals with another principle on which the electromagnetic field generating element 1 reads magnetic data.

FIG. 10 is a view illustrating another manner in which the electromagnetic field generating element 1 reads magnetic data. FIG. 11 is a view illustrating still another manner in which the electromagnetic field generating element 1 reads magnetic data. The electromagnetic field generating element 1 illustrated in each of FIGS. 10 and 11 further includes a magnetoresistance effect element (reproduction section) 101. The magnetoresistance effect element 101 changes its electrical resistance in accordance with whether or not a magnetic field is applied thereto, and converts a magnetic field generated by the electromagnetic field generating element 1 into an electrical signal. The magnetoresistance effect element 101 is made up, for example, of a widely known giant magnetoresistance (GMR) element. The magnetoresistance effect element 101 is provided so as to be in contact with the electromagnetic field generating element 1. Specifically, FIG. 10 illustrates the magnetoresistance effect element 101 formed in the form of a layer above the electromagnetic field generating element 1, while FIG. 11 illustrates the magnetoresistance effect element 101 formed between the substrate 10 and the conductor 13 of the electromagnetic field generating element 1. In the case of FIG. 11, the magnetoresistance effect element 101 is disposed in the form of a layer on the substrate 10 of the electromagnetic field generating element 1, and then the other members constituting the electromagnetic field generating element 1 (e.g., the conductor 13, the soft magnetic body 17) are successively stacked, for example, as illustrated in (a) through (e) of FIG. 2.

A conventional optically assisted information recording and reproduction device may include the electromagnetic field generating element 1 so as to read data, provided that the electromagnetic field generating element 1 includes a read element such as the magnetoresistance effect element 101.

Each of FIGS. 10 and 11 illustrates as an electromagnetic field generating element the electromagnetic field generating element 1 illustrated in (a) and (b) of FIG. 1. However, the arrangement is not limited to this; the electromagnetic field generating element 2 illustrated in (a) and (b) of FIG. 3 may also be used instead.

As discussed above, each of the electromagnetic field generating elements of the present invention is suitably applicable, for example, in an information recording and reproduction head that reads and writes data by means of magnetization and near-field light.

FIGS. 9 through 11 may each be construed as a view illustrating a schematic arrangement of an information recording and reproduction head of the present invention.

Further, the information recording and reproduction head of the present invention is suitably applicable in an information recording and reproduction device that reads and writes data by means of magnetization and near-field light. Such an information recording and reproduction device including the information recording and reproduction head of the present invention achieves the same technical advantage as above.

With reference to FIGS. 12 and 13, the following description deals with an information recording and reproduction device including the above information recording and reproduction head.

FIG. 12 is a perspective view illustrating an arrangement of main members of the information recording and reproduction device of the present invention.

The information recording and reproduction device 221 illustrated in FIG. 12 includes an information recording and reproduction head 213 attached to a slider 212.

The information recording and reproduction head 213 is so arranged as to glide over the recording surface (not shown) of a rotating data recording medium (object) 220, and is made up, for example, of the electromagnetic field generating element 1 provided with the galvanometer 92 illustrated in FIG.

9. The data recording medium 220 is, for example, a magnetic recording medium 30. The slider 212 is supported by an arm 211. The data recording medium 220 is scanned for a recording track with use of an actuator 225 serving as moving means.

FIG. 13 is a schematic block diagram illustrating an arrangement of a reproduction/recording system of the information recording and reproduction device 221. The reproduction/recording system includes: a reproduction/recording control terminal 252 through which a superordinate device controls reproduction and recording; an input terminal 251 through which recording data is fed from a superordinate device; and an output terminal 262 through which reproduction data is outputted to a superordinate device. The reproduction/recording control terminal 252 is connected to a reproduction/recording control section 258 that controls reproduction and recording. The input terminal 251 is connected to a data recording section 253 that converts the recording data into a recording signal. The output terminal 262 is connected to a data reproducing section 261 that encodes a read signal.

The reproduction/recording control section 258 is connected to: the data recording section 253; the data reproducing section 261; a laser drive section 254 that controls a laser drive current of a laser light generating section 255; and a current control section 259 that controls a current of a magnetic field generating section 257 that generates a recording magnetic field in accordance with the recording signal fed from the data recording section 253.

The current control section 259, in accordance with the recording signal from the data recording section 253 and a command from the reproduction/recording control section 258, applies a current to the magnetic field generating section 257, the current corresponding to the recording data.

In response to a command from the reproduction/recording control section 258, a current detecting section 260 reads a magnetic signal on a raised-temperature area of the data recording medium 220 and outputs a read signal to the data reproducing section 261.

The following description deals with a reproduction/recording operation in the above reproduction/recording system.

In the write operation, in response to a command from the reproduction/recording control section 258, the laser drive section 254 drives the laser light generating section 255 to irradiate the magnetic field generating section 257 with output laser light.

Also, in response to a command from the reproduction/recording control section 258, (i) the data recording section 253 converts recording data from the input terminal 251 into a recording signal and outputs the recording signal to the current control section 259, and (ii) the current control section 259 applies a current to the magnetic field generating section 257, the current corresponding to the recording signal. As a result, the magnetic field generating section 257 generates a recording magnetic field.

The output laser light excites a surface plasmon in the magnetic field generating section 257. The surface plasmon generates a near-field light, which then raises the temperature of a portion of the data recording medium 220 to a temperature necessary for writing data. The recording magnetic field generated by the magnetic field generating section 257 causes a recording mark to be written on the portion of the data recording medium 220.

In the read operation, in response to a command from the reproduction/recording control section 258, the current detecting section 260 (i) detects a current into which the magnetic field generating section 257 converts a magnetic signal corresponding to the recording mark on the data recording medium 220, and (ii) outputs a detection signal to the data reproducing section 261. The laser light generating section 255 may be driven during the read operation, if necessary, so that the temperature of the corresponding portion of the data recording medium 220 is raised to a temperature necessary for reading data (i.e., so that optical assistance is provided).

In response to a command from the reproduction/recording control section 258, the data reproducing section 261 converts the detection signal from the current detecting section 260 into reproduction data and outputs the reproduction data to the output terminal 262.

The information recording and reproduction device of the present invention reads and writes magnetic data by means of the information recording and reproduction head of the present invention. As such, the information recording and reproduction device of the present invention is capable of applying a high magnetic field and also applying such a magnetic field to an area of a magnetic recording medium, the area having a temperature that has been raised to the largest extent by light irradiation. This allows for achievement of an information recording and reproduction device that performs optically assisted magnetic recording at high efficiency.

In order to solve the above problem, the electromagnetic field generating element of the present invention is an electromagnetic field generating element which causes (i) near-field light to be generated in a conductor in response to irradiation of the conductor with light and (ii) a magnetic field to be generated in response to a current flowing through the conductor, including: a soft magnetic body provided in a direction perpendicular to a first direction in which the conductor faces an object to which the near-field light and the magnetic field are applied, and perpendicular to a second direction in which the current of the conductor flows.

A soft magnetic body, when a magnetic field is applied thereto, generates a magnetic field having an extensive intensity in proportion to the following formula:

(intensity of a magnetic field applied)×(magnetic permeability µ of the soft magnetic body).

In view of this, the inventors of the present invention arrived at the idea of providing a soft magnetic body in an electromagnetic field generating element, in accordance with the linear velocity of an object in motion, in such a position that a high magnetic field is applied to a portion of the object, the portion having a temperature that has been raised to the largest extent by irradiation of near-field light, thereby arriving at the above arrangement. Specifically, the electromagnetic field generating element of the present invention includes the soft magnetic body provided at a position of the conductor along the dimension perpendicular to (i) the direction in which the conductor faces the object to which the near-field light and the magnetic field are applied and to (ii) the direction in which the current flows.

The phrase "the direction in which the conductor faces the object" used herein refers to the direction in which the linear distance between the object and the conductor is shortest. Further, the soft magnetic body used herein refers to a magnetic body having a coercive force that is low enough for its magnetization to be reversed by a magnetic field having the above intensity; for example, a magnetic body having a coercive force not more than 63.7kA/m (equivalent to 0.08 T).

As such, the electromagnetic field generating element of the present invention is suitably used for optically assisted magnetic read/write involving use of near-field light. Specifically, the provision of the electromagnetic field generating element of the present invention in an information recording and reproduction head for performing optically assisted magnetic read/write allows a magnetic field to be easily applied, in accordance with the linear velocity of a magnetic recording medium on which magnetic recording is to be performed, to an area of the magnetic recording medium, the area having a temperature that has been raised to the largest extent by irradiation with the near-field light. Unlike in an information recording and reproduction head including a conventional electromagnetic field generating element, this eliminates the need to sufficiently increase the intensity of irradiation light, i.e., the temperature of a recording area of the magnetic recording medium in compensation for a low magnetic field and for a positional difference between an area having a raised temperature and an area to which a magnetic field is applied. This consequently allows for reduction in the power consumption.

The electromagnetic field generating element of the present invention may be arranged such that the conductor includes a constricted portion in which the near-field light is generated in response to the irradiation of the conductor with the light and the current is narrowed so that the current thus narrowed causes the magnetic field to be generated.

The above arrangement causes the current to have a narrowed path at the constricted portion of the conductor.

This allows the conductor to generate a sufficiently high magnetic field. Thus, the electromagnetic field generating element is capable of generating the sufficiently high magnetic field even when only a small amount of current is applied to the conductor. This consequently allows for further reduction in the power consumption.

The electromagnetic field generating element of the present invention may be arranged such that the conductor has a groove section whose bottom portion constitutes the constricted portion, and the groove section has a gap whose dimension in the second direction is shorter than a wavelength of the light.

According to the above arrangement, irradiation of the constricted portion with the light causes the constricted portion to emit the near-field light.

The electromagnetic field generating element of the present invention may be arranged such that the soft magnetic body is a soft magneto-insulator. The soft magneto-insulator used herein refers to a soft magnetic body that is less conductive than a conductor; for example, a soft magnetic body having a resistivity of not less than 0.1 Ωcm.

According to the above arrangement, the soft magnetic body is provided as a member having a high electrical resistance. Thus, even in the case where the soft magnetic body and the conductor are in contact with each other, no current flows through the soft magnetic body, i.e., no current is short-circuited. The electromagnetic field generating element of the present invention may be produced with a relatively easy production method in this case.

The electromagnetic field generating element of the present invention may be arranged such that the soft magnetic body and the conductor are separated from each other. The state in which "the soft magnetic body and the conductor are separated from each other" refers to the state in which the soft magnetic body and the conductor are disposed, for example, 10 nm or more apart from each other, so that there occurs substantially no charge transfer between them arising from a tunnel current, discharge or the like.

The above arrangement prevents a current from flowing through the soft magnetic body, i.e., from short-circuiting, even when the soft magnetic body is made of a conductor. This allows for use of a metallic magnetic material as a material of the soft magnetic body. Metallic magnetic materials are excellent in magnetic characteristics such as magnetic permeability μ and saturation magnetization. Using such metallic magnetic materials for the soft magnetic body easily allows the soft magnetic body to generate an improved magnetic field.

The electromagnetic field generating element of the present invention may be arranged such that the soft magnetic body is provided in accordance with a linear velocity of the object.

For example, an information recording and reproduction head including the electromagnetic field generating element causes a positional difference between (i) an area of the magnetic recording medium, the area being irradiated with the light and (ii) an area of the magnetic recording medium, the area having the largest temperature rise. The positional difference ranges from 10 nm to 200 nm, depending on the rotation rate (linear velocity) of the magnetic recording medium. Disposing the soft magnetic body and the constricted portion, i.e., the bottom portion of the conductor so that the distance between them is not less than 10 nm and not more than 200 nm allows for optimization of the distance between (i) an area to which a magnetic field is applied and (ii) the area irradiated with the near-field light, in accordance with the rotation rate (linear velocity) of the magnetic recording medium. In view of this, the gap between the soft magnetic body and the constricted portion is preferably not less than 10 nm and not more than 200 nm. As described above, the position of the soft magnetic body, i.e., the position at which the magnetic field generated by the soft magnetic body is highest, is preferably determined as appropriate in accordance with the linear velocity of the object.

The electromagnetic field generating element of the present invention may be arranged such that the soft magnetic body has a dimension of not less than 10 nm and not more than 1000 nm in the direction perpendicular to the first and second directions.

If the dimension of the soft magnetic body along the direction perpendicular to (i) the direction in which the conductor faces the object and to (ii) the direction in which the current flows is less than 10 nm, i.e., when the soft magnetic body has a thickness of less than 10 nm, the soft magnetic body has an excessively high coercive force, which impedes magnetization reversal of the soft magnetic body. On the other hand, the soft magnetic body having a thickness of more than 1000 nm generates a magnetic field having an area of more than 1000 nm. This excessively large area of a magnetic field is undesirable; it causes an information recording and reproduction head including the electromagnetic field generating element of the present invention to form large magnetic bits on the magnetic recording medium on which magnetic recording is performed. Such an information recording and reproduction head is unsuitable for high-density recording. In view of the above, the soft magnetic body preferably has a thickness in the range of 10 to 1000 nm.

The electromagnetic field generating element of the present invention may be arranged such that the soft magnetic body has a first dimension in the first direction and a second dimension in the second direction, the first and second dimensions being different from each other.

The soft magnetic body satisfying the above relation allows the electromagnetic field generating element of the present invention to properly apply a magnetic field when writing data.

The electromagnetic field generating element of the present invention may be arranged such that the soft magnetic body is shaped such that the soft magnetic body is shaped such that the first dimension is longer than the second dimension.

The soft magnetic body satisfying the foregoing relation has magnetic anisotropy in which its easy direction of magnetization coincides with the direction in which the soft magnetic body faces the object, i.e., the direction in which the soft magnetic body faces a recording medium when the electromagnetic field generating element is included in an information recording and reproduction head. In general, the magnetization direction of a magnetic body tends to coincide with its easy direction of magnetization. While the magnetic field generated at the constricted portion is in a cyclic shape and therefore has various magnetization directions, the soft magnetic body satisfying the above relation tends to have a magnetization direction coinciding with the direction in which the soft magnetic body faces the object. This allows for precise and uniform application of a magnetic field.

The electromagnetic field generating element of the present invention may be arranged such that the soft magnetic body is shaped such that the first dimension is shorter than the second dimension.

The soft magnetic body satisfying the foregoing relation has its easy direction of magnetization that does not coincide with the direction in which the soft magnetic body faces the object, i.e., the direction in which the soft magnetic body faces a recording medium when the electromagnetic field generating element is included in an information recording and reproduction head. This causes substantially no remanent magnetization in the direction in which the soft magnetic body faces the object. This in turn facilitates magnetization reversal with respect to this direction and also improves the frequency characteristics of the magnetization reversal. Thus, the above arrangement is suitable for rapid recording.

The electromagnetic field generating element of the present invention may be arranged such that the soft magnetic body has saturation magnetization of not less than 0.2 T and not more than 1 T.

When optically assisted magnetic recording is performed, a portion of the magnetic recording medium, the portion having been provided with optical assistance, normally has a coercive force of about 159 kA/m (equivalent to 0.2 T). This requires magnetization of 159 kA/m or more for performing recording. A soft magnetic body having saturation magnetization of more than 1 T may cause recording to be performed merely with its own magnetization, regardless of whether or not optical assistance is provided. Therefore, the soft magnetic body most suitably has saturation magnetization of not less than 0.2 T and not more than 1 T for performing high-density magnetic recording by means of optically assisted magnetic recording.

The electromagnetic field generating element of the present invention may be arranged such that the soft magnetic body contains ferrite.

Ferrite is an insulating, soft magnetic material. Thus, containment of ferrite in the soft magnetic body allows the soft magnetic body to be a magnetic body having a high resistance and a high magnetic permeability. While a magnetic body is generally made of metal, ferrite has a small extinction coefficient k, which is unlikely to prevent propagation of a surface plasmon. The use of ferrite as a material of the soft magnetic body allows excellent magnetic characteristics to be obtained.

An information recording and reproduction head of the present invention includes any one of the above electromagnetic field generating elements. Specifically, the information recording and reproduction head of the present invention includes any one of the above electromagnetic field generating elements, wherein an object to which the electromagnetic field generating element applies the near-field light and the magnetic field is a magnetic recording medium, and the information recording and reproduction head further includes a reproduction section for reproducing information which has been recorded on a target portion of the magnetic recording medium.

The information recording and reproduction head of the present invention may preferably be arranged such that the reproduction section is a current measuring section for measuring a current flowing through the conductor; and the information which has been recorded on the target portion of the magnetic recording medium is reproduced in accordance with a change in the current which flows the conductor and has been measured by the current measuring section. However, the method of reading data with use of the information recording and reproduction head of the present invention is not limited to this. For example, the reading section may be a magnetoresistance effect element. In this case, the data written on the magnetic recording medium is reproduced in response to an electrical signal obtained through conversion, by the magnetoresistance effect element, of a magnetic field generated by the electromagnetic field generating element.

An information recording and reproduction device of the present invention includes either of the information recording and reproduction heads.

According to the above arrangement, the information recording and reproduction device is capable of applying a high magnetic field and also applying such a magnetic field to an area of an object, the area having a temperature that has been raised to the largest extent by light irradiation. This allows for achievement of an information recording and reproduction head and an information recording and reproduction device that perform optically assisted magnetic recording at high efficiency.

The present invention is not limited to the description of the embodiments above, but may be altered by a skilled person within the scope of the claims. An embodiment based on a proper combination of technical means disclosed in different embodiments is encompassed in the technical scope of the present invention.

The present invention is suitably applicable in an electromagnetic field generating element (electromagnetic field generating element), an information recording and reproduction head, an information recording and reproduction device and the like, each of which causes magnetization and near-field light.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An electromagnetic field generating element which causes (i) near-field light to be generated in a conductor in response to irradiation of the conductor with light and (ii) a magnetic field to be generated in response to a current flowing through the conductor, comprising:
   a soft magnetic body provided in a direction perpendicular to a first direction in which the conductor faces an object to which the near-field light and the magnetic field are applied, and perpendicular to a second direction in which the current of the conductor flows, wherein the conductor includes a constricted portion in which the near-field light is generated in response to the irradiation of the conductor with the light and the current is narrowed so that the current thus narrowed causes the magnetic field to be generated.

2. The electromagnetic field generating element according to claim 1, wherein:
the conductor has a groove section whose bottom portion constitutes the constricted portion, and
the groove section has a gap whose dimension in the second direction is shorter than a wavelength of the light.

3. The electromagnetic field generating element according to claim 1, wherein the soft magnetic body is a soft magneto-insulator.

4. The electromagnetic field generating element according to claim 1, wherein the soft magnetic body and the conductor are separated from each other.

5. An electromagnetic field generating element which causes (i) near-field light to be generated in a conductor in response to irradiation of the conductor with light and (ii) a magnetic field to be generated in response to a current flowing through the conductor, comprising:
a soft magnetic body provided in a direction perpendicular to a first direction in which the conductor faces an object to which the near-field light and the magnetic field are applied, and perpendicular to a second direction in which the current of the conductor flows,
wherein the soft magnetic body and the conductor are separated from each other,
wherein the soft magnetic body is provided in accordance with a linear velocity of the object.

6. An electromagnetic field generating element which causes (i) near-field light to be generated in a conductor in response to irradiation of the conductor with light and (ii) a magnetic field to be generated in response to a current flowing through the conductor, comprising:
a soft magnetic body provided in a direction perpendicular to a first direction in which the conductor faces an object to which the near-field light and the magnetic field are applied, and perpendicular to a second direction in which the current of the conductor flows,
wherein the soft magnetic body has a dimension of not less than 10 nm and not more than 1000 nm in the direction perpendicular to the first and second directions.

7. An electromagnetic field generating element which causes (i) near-field light to be generated in a conductor in response to irradiation of the conductor with light and (ii) a magnetic field to be generated in response to a current flowing through the conductor, comprising:
a soft magnetic body provided in a direction perpendicular to a first direction in which the conductor faces an object to which the near-field light and the magnetic field are applied, and perpendicular to a second direction in which the current of the conductor flows,
wherein the soft magnetic body has a first dimension in the first direction and a second dimension in the second direction, the first and second dimensions being different from each other.

8. The electromagnetic field generating element according to claim 7, wherein the soft magnetic body is shaped such that the first dimension is longer than the second dimension.

9. The electromagnetic field generating element according to claim 7, wherein the soft magnetic body is shaped such that the first dimension is shorter than the second dimension.

10. An electromagnetic field generating element which causes (i) near-field light to be generated in a conductor in response to irradiation of the conductor with light and (ii) a magnetic field to be generated in response to a current flowing through the conductor, comprising:
a soft magnetic body provided in a direction perpendicular to a first direction in which the conductor faces an object to which the near-field light and the magnetic field are applied, and perpendicular to a second direction in which the current of the conductor flows,
wherein the soft magnetic body has saturation magnetization of not less than 0.2 T and not more than 1 T.

11. The electromagnetic field generating element according to claim 1, wherein the soft magnetic body contains ferrite.

12. An information recording and reproduction head, comprising an electromagnetic field generating element,
said electromagnetic field generating element causing (i) near-field light to be generated in a conductor in response to irradiation of the conductor with light and (ii) a magnetic field to be generated in response to a current flowing through the conductor,
said electromagnetic field generating element comprising a soft magnetic body provided in a direction perpendicular to a first direction in which the conductor faces an object to which the near-field light and the magnetic field are applied, and perpendicular to a second direction in which the current of the conductor flows,
the object being a magnetic recording medium, and
said information recording and reproduction head further comprising a reproduction section for reproducing information which has been recorded on a target portion of the magnetic recording medium.

13. The information recording and reproduction head according to claim 12, wherein:
the reproduction section is a current measuring section for measuring a current flowing through the conductor; and
the information which has been recorded on the target portion of the magnetic recording medium is reproduced in accordance with a change in the current which flows the conductor and has been measured by the current measuring section.

14. An information recording and reproduction device comprising an information recording and reproduction head, said information recording and reproduction head including an electromagnetic field generating element, said electromagnetic field generating element causing (i) near-field light to be generated in a conductor in response to irradiation of the conductor with light and (ii) a magnetic field to be generated in response to a current flowing through the conductor, said electromagnetic field generating element comprising a soft magnetic body provided in a direction perpendicular to a first direction in which the conductor faces an object to which the near-field light and the magnetic field are applied, and perpendicular to a second direction in which the current of the conductor flows,
the object being a magnetic recording medium, and
said information recording and reproduction head further comprising a reproduction section for reproducing information which has been recorded on a target portion of the magnetic recording medium.

* * * * *